United States Patent
Kidachi

(10) Patent No.: US 10,356,989 B2
(45) Date of Patent: *Jul. 23, 2019

(54) EMITTER AND DRIP IRRIGATION TUBE

(71) Applicant: Enplas Corporation, Saitama (JP)

(72) Inventor: Masahiro Kidachi, Saitama (JP)

(73) Assignee: Enplas Corporation, Saitama (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/037,981

(22) PCT Filed: Nov. 26, 2014

(86) PCT No.: PCT/JP2014/081176
§ 371 (c)(1),
(2) Date: May 19, 2016

(87) PCT Pub. No.: WO2015/080126
PCT Pub. Date: Jun. 4, 2015

(65) Prior Publication Data
US 2016/0278311 A1  Sep. 29, 2016

(30) Foreign Application Priority Data

Nov. 27, 2013  (JP) .................................. 2013-245228

(51) Int. Cl.
*A01G 25/02*  (2006.01)
*B05B 1/20*  (2006.01)
(Continued)

(52) U.S. Cl.
CPC ............ *A01G 25/023* (2013.01); *B05B 1/202* (2013.01); *B05B 1/3006* (2013.01); *A01G 25/02* (2013.01); *A01G 25/165* (2013.01); *Y02A 40/237* (2018.01)

(58) Field of Classification Search
CPC .... A01G 25/02; A01G 25/023; A01G 25/165; B05B 12/088; B05B 1/202; B05B 1/3006; Y02A 40/237
(Continued)

(56) References Cited

U.S. PATENT DOCUMENTS 4,210,287 A * 7/1980 Mehoudar ............ A01G 25/023
239/542
4,687,143 A  8/1987 Gorney et al.
(Continued)

FOREIGN PATENT DOCUMENTS

EP  2594339 A1  5/2013
JP  5-276842 A  10/1993
(Continued)

OTHER PUBLICATIONS

International Search Report from International Application No. PCT/JP2014/081176 dated Dec. 22, 2014.
(Continued)

*Primary Examiner* — Steven J Ganey
*Assistant Examiner* — Joseph A Greenlund
(74) *Attorney, Agent, or Firm* — Brundidge & Stanger, P.C.

(57) ABSTRACT

An emitter (120) forms a flow path that runs to a discharge part (250) from an intake part (220) for receiving an irrigation liquid in a tube. The flow path includes a flow volume control part (240) which includes: an end surface (243) including a concave inclined surface that faces a film (300) for receiving the pressure of the liquid inside the tube; a hole (244) that opens at the center of the flow volume control part (240) and connects to the discharge part (250); and a groove (245) crossing the inclined surface and running to the hole (244). When the film (300) adheres to the inclined surface as a result of the pressure of the irrigation liquid inside the tube,
(Continued)

the flow volume of the irrigation liquid inside the emitter (120) is controlled so as to be a volume that can pass through the groove (245).

5 Claims, 17 Drawing Sheets

(51) Int. Cl.
    *B05B 1/30*     (2006.01)
    *A01G 25/16*     (2006.01)

(58) Field of Classification Search
    USPC ........................................................ 239/542
    See application file for complete search history.

(56) References Cited

U.S. PATENT DOCUMENTS

| | | | | |
|---|---|---|---|---|
| 6,027,048 | A * | 2/2000 | Mehoudar | A01G 25/023 138/42 |
| 6,302,338 | B1 * | 10/2001 | Cohen | A01G 25/023 239/542 |
| 6,945,476 | B2 * | 9/2005 | Giuffre | A01G 25/023 239/542 |
| 7,648,085 | B2 * | 1/2010 | Mavrakis | A01G 25/023 239/542 |
| 8,511,585 | B2 * | 8/2013 | Keren | A01G 25/023 239/542 |
| 8,998,113 | B2 * | 4/2015 | Keren | A01G 25/023 239/542 |
| 9,345,205 | B2 * | 5/2016 | Kidachi | A01G 25/023 |
| 9,743,595 | B2 * | 8/2017 | Mavrakis | A01G 25/023 |
| 2005/0284966 | A1 * | 12/2005 | DeFrank | A01G 25/023 239/542 |
| 2006/0255186 | A1 | 11/2006 | Ruskin | |
| 2009/0266919 | A1 | 10/2009 | Mavrakis et al. | |
| 2012/0160926 | A1 * | 6/2012 | Lutzki | A01G 25/023 239/11 |
| 2012/0305676 | A1 | 12/2012 | Keren | |
| 2016/0286742 | A1 * | 10/2016 | Kidachi | A01G 25/023 |
| 2016/0295816 | A1 * | 10/2016 | Kidachi | A01G 25/023 |

FOREIGN PATENT DOCUMENTS

| | | |
|---|---|---|
| JP | 2010-046094 A | 3/2010 |
| WO | 2006/119501 A1 | 11/2006 |

OTHER PUBLICATIONS

Extended European Search Report for 14865659.8 dated Jun. 13, 2017.

* cited by examiner

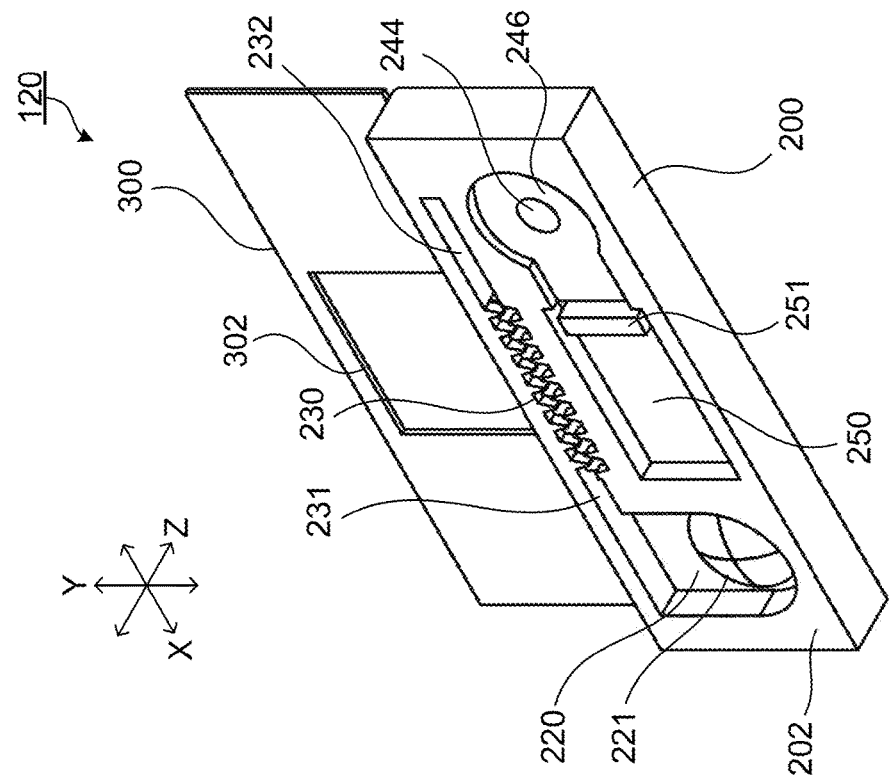
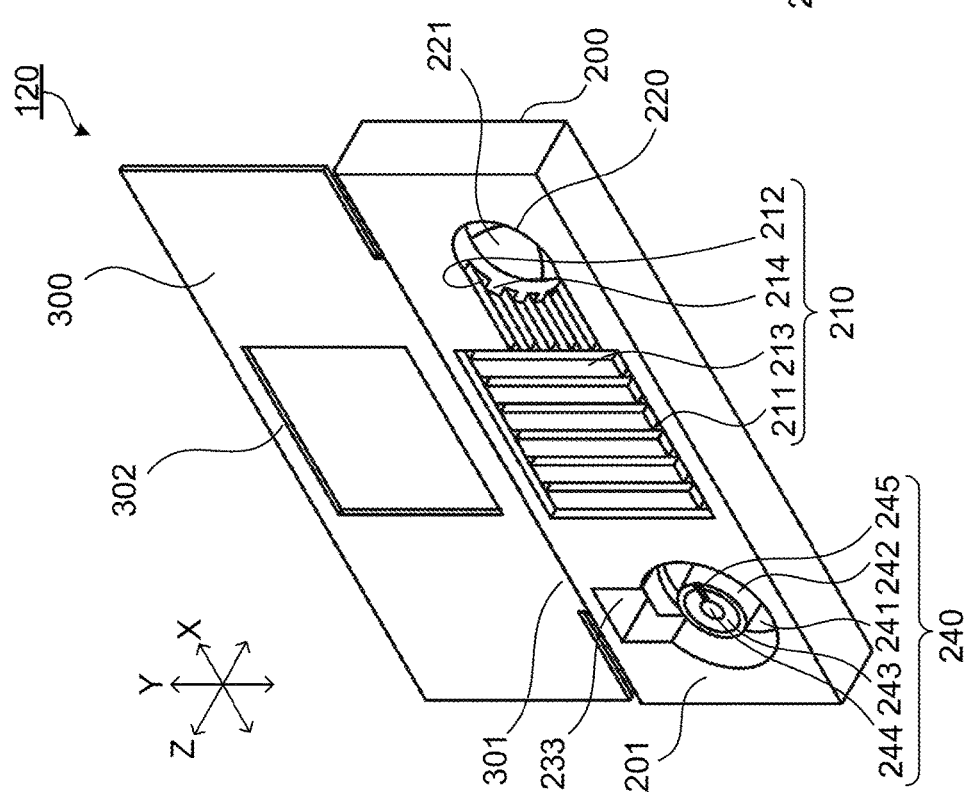
FIG. 6A
FIG. 6B

EMITTER AND DRIP IRRIGATION TUBE

TECHNICAL FIELD

The present invention relates to an emitter and a trickle irrigation tube including the emitter.

BACKGROUND ART

A trickle irrigation method is known as a method for culturing plants. In the trickle irrigation method, for example, a trickle irrigation tube is disposed on the soil in which plants are planted, and irrigation liquid such as water and liquid fertilizer is slowly supplied from the trickle irrigation tube to the soil. The trickle irrigation method can minimize the consumption amount of the irrigation liquid, and has been increasingly attracting attention in recent years.

The trickle irrigation tube typically has a tube and an emitter (also called "dripper"). The emitter typically supplies the soil with the irrigation liquid in the tube at a predetermined rate at which the irrigation liquid is dropped to the soil. Emitters which are pierced into the tube from the outside, and emitters joined to the inner wall surface of the tube are known.

For example, the latter emitter has a channel including a pressure reduction channel for allowing the liquid having entered the emitter from the internal space of the tube toward the through hole of the tube while reducing the pressure of the liquid, and a diaphragm part configured to change the volume of a portion of the channel where the irrigation liquid having reduced pressure flows in accordance with the pressure of the liquid of the internal space. The emitter is composed of a member which is joined to the inner wall surface of the tube, a member which is disposed on the member joined to the inner wall surface, and a diaphragm part which is disposed between the two members. The diaphragm part is composed of an elastic film such as a silicone rubber film (see, for example, PTL 1).

The emitter can suppress variation of the discharge rate of the irrigation liquid regardless of change of the pressure of the liquid in the internal space of the tube. Therefore, the emitter is advantageous from the viewpoint of uniformly growing multiple plants.

CITATION LIST

Patent Literature

PTL 1
Japanese Patent Application Laid-Open No. 2010-46094

SUMMARY OF INVENTION

Technical Problem

The emitter is formed by assembling three components. In view of this, the emitter may cause assembling error. In particular, the assembling error of the diaphragm part may cause variation of the operation of the diaphragm part, and variation of the discharge rate of the irrigation liquid.

In addition, the emitter is typically a molded article of an inexpensive resin such as polyethylene and polypropylene, and the diaphragm part is composed of a more expensive elastic material such as a silicone rubber film. The use of components of different materials has a room for improvement in material cost reduction.

Further, in the case of a trickle irrigation tube, hundreds of emitters are disposed in one tube in some cases. In the case of a long trickle irrigation tube, the supply pressure of liquid to the tube is required to be increased, and consequently the liquid discharge rate of the emitter may not be stable. In view of this, control of the discharge rate of the liquid of the emitter in accordance with the pressure of the liquid in the tube is desired.

Furthermore, from the viewpoint of reducing the material cost and the manufacturing cost of the emitter, an emitter which can be manufactured with a single inexpensive material and fewer number of components is desired.

An object of the present invention is to provide an emitter which can stabilize the discharge rate of the irrigation liquid and can further reduce the manufacturing cost.

In addition, another object of the present invention is to provide a trickle irrigation tube having the emitter.

Solution to Problem

An emitter according to an embodiment of the present invention is intended for quantitatively discharging irrigation liquid in a tube from a discharge port communicating between an inside and an outside of the tube, the emitter being configured to be joined to an inner wall surface of the tube configured to distribute the irrigation liquid at a position corresponding to the discharge port, the emitter including: a water collecting part for receiving the irrigation liquid in the tube; a pressure reduction channel for allowing the irrigation liquid received from the water collecting part to flow therethrough while reducing a pressure of the irrigation liquid; a flow rate control part for controlling a flow rate of the irrigation liquid supplied from the pressure reduction channel in accordance with the pressure of the irrigation liquid in the tube; and a discharge part to which the irrigation liquid having a flow rate controlled by the flow rate control part, is supplied, the discharge part being to be facing the discharge port, wherein: the water collecting part opens at a first surface which is not joined to the tube in the emitter; the flow rate control part includes: an opening part which opens at the first surface; a film having flexibility and sealing the opening part to block a communication of a channel on a downstream side relative to the pressure reduction channel and the inside of the tube; a recessed surface part depressed with respect to the film and disposed at a position where the recessed surface part faces the film in the channel on a downstream side relative to the pressure reduction channel without making contact with the film, but the recessed surface part being capable of making close contact with the film; a hole opening at the recessed surface part and communicated with the discharge part; and a groove formed on the recessed surface part and configured to communicate between the hole and the channel on outside relative to the recessed surface part; and the film makes close contact with the recessed surface part when the pressure of the irrigation liquid in the tube is equal to or higher than a predetermined value.

In addition, an emitter according to an embodiment of the present invention includes: a water collecting part for receiving irrigation liquid in a tube, the water collecting part having a cylindrical shape to be inserted to the tube from outside of the tube, the tube being configured to distribute the irrigation liquid; a pressure reduction channel for allowing the irrigation liquid received from the water collecting part to flow therethrough while reducing a pressure of the irrigation liquid; a flow rate control part for controlling a flow rate of the irrigation liquid supplied from the pressure reduction channel in accordance with the pressure of the irrigation liquid in the tube; and a discharge part for discharging the irrigation liquid having a flow rate controlled by the flow rate control part to outside of the tube, wherein: a flange part is disposed at a base end of the water collecting part, the base end representing, when one end of the water collecting part from which the water collecting part is inserted to the tube is defined as a tip end, the other end of the water collecting part; the flange part is composed of a combination of a first disk part disposed at the base end of the water collecting part and a second disk part on which the discharge part is disposed, the flange part including the pressure reduction channel and the flow rate control part; the flow rate control part includes: a film having flexibility and facing a channel on a downstream side relative to the pressure reduction channel; a pressure transmission part for transmitting the pressure of the irrigation liquid in the tube to a rear surface of the film; a recessed surface part depressed with respect to the film and disposed at a position where the recessed surface part faces the film in the channel on a downstream side relative to the pressure reduction channel without making contact with the film, but the recessed surface part being capable of making close contact with the film; a hole opening at the recessed surface part and communicated with the discharge part; and a groove formed on the recessed surface part and configured to communicate between the hole and the channel on outside relative to the recessed surface part; and the film makes close contact with the recessed surface part when the pressure of the irrigation liquid in the tube is equal to or higher than a predetermined value.

Further, a trickle irrigation tube according to an embodiment of the present invention includes: a tube; and at least one emitter, the emitter being the above-mentioned emitter.

Advantageous Effects of Invention

The emitter according to the present invention controls the discharge rate of the irrigation liquid in accordance with the pressure of the irrigation liquid in the trickle irrigation tube, and thus can stabilize the discharge rate of the irrigation liquid. In addition, since the emitter according to the present invention can be formed with one or two components by injection molding of a resin material, the manufacturing cost can be further reduced in comparison with conventional emitters composed of three parts.

BRIEF DESCRIPTION OF DRAWINGS

FIG. 6A illustrates a top surface, a front surface and a side surface of the emitter of Embodiment 1 in the state before the film is joined to the emitter main body, and FIG. 6B illustrates a bottom surface, a front surface and a side surface of the emitter;

DESCRIPTION OF EMBODIMENTS

In the following, embodiments of the present invention are described in detail with reference to the accompanying drawings.

[Embodiment 1]
(Configuration)

Figure 1:
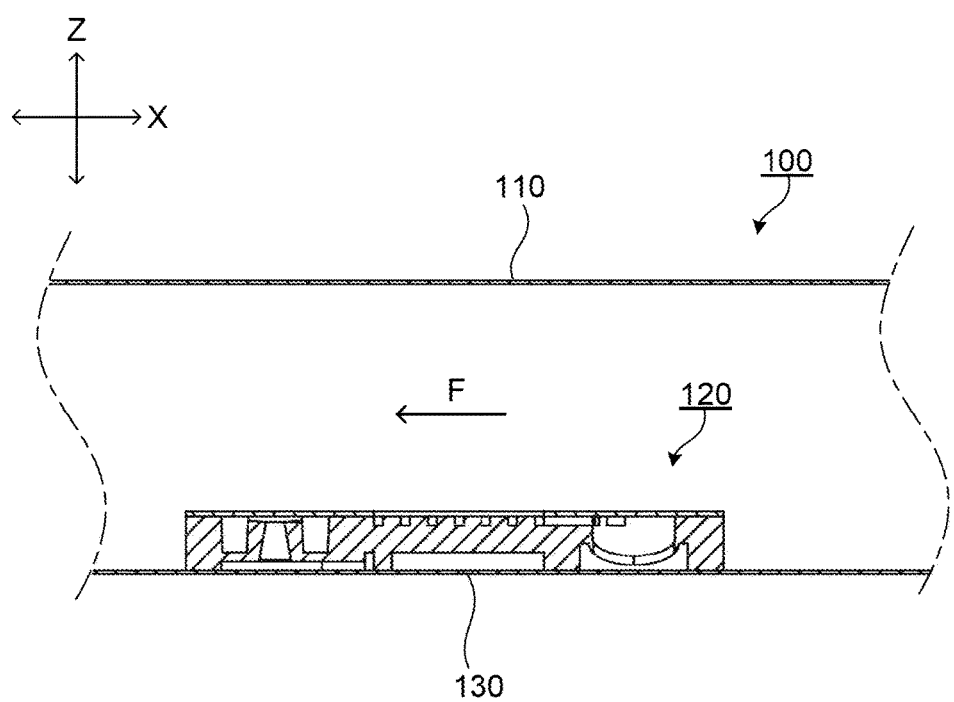
FIG. 1 is a schematic sectional view of a trickle irrigation tube according to Embodiment 1 of the present invention.

FIG. 1 is a schematic sectional view of a trickle irrigation tube according to Embodiment 1 of the present invention. Trickle irrigation tube 100 is composed of tube 110 and emitter 120. Tube 110 is made of polyethylene, for example. Emitter 120 is disposed at a predetermined interval (for example, 200 to 500 mm) in the axial direction of tube 110. Each emitter 120 is joined on the inner wall surface of tube 110. Emitter 120 is disposed at a position where emitter 120 covers discharge port 130 of tube 110. Discharge port 130 is a hole which extends through the tube wall of tube 110. The hole diameter of discharge port 130 is, for example, 1.5 mm. It is to be noted that arrow F indicates the direction of flow of the irrigation liquid in tube 110.

Figure 2A:
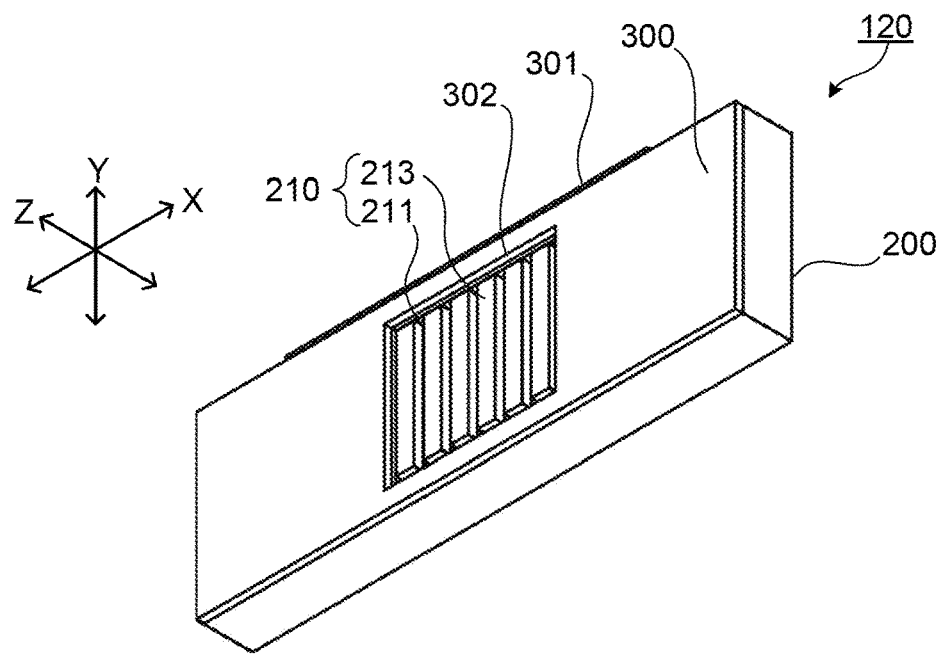
FIG. 2A illustrates a top surface, a front surface and a side surface of an emitter according to Embodiment 1.
Figure 2B:
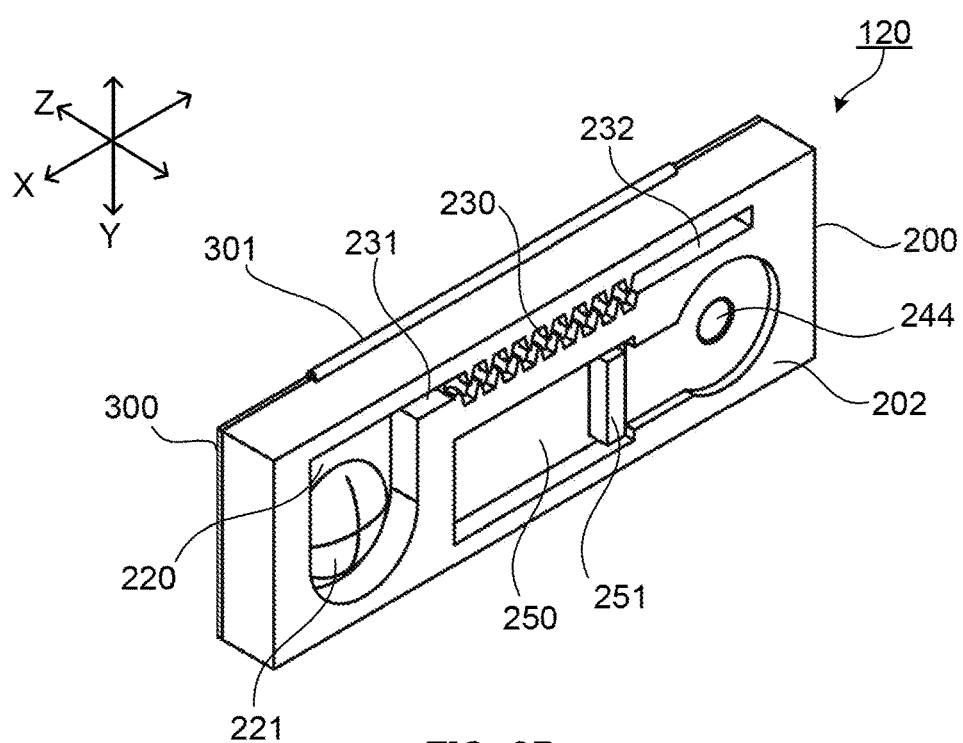
FIG. 2B illustrates a bottom surface, a front surface and a side surface of the emitter.
Figure 3A:
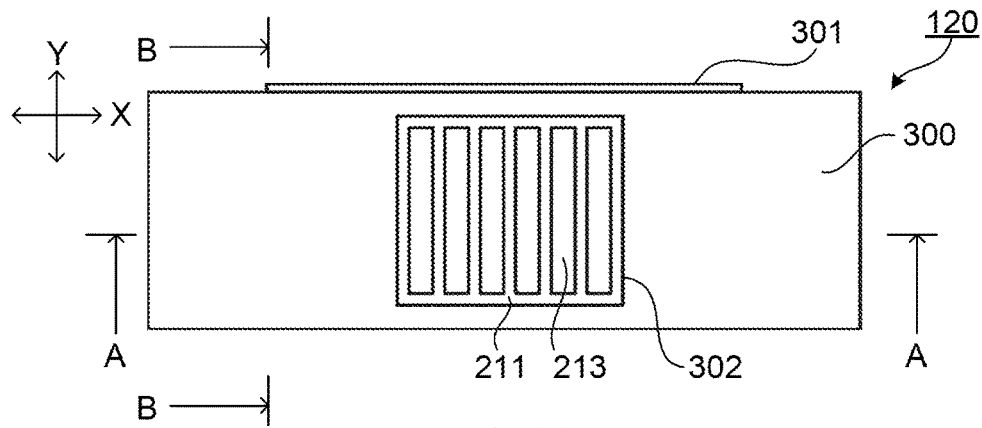
FIG. 3A is a plan view of the emitter according to Embodiment 1.
Figure 3B:
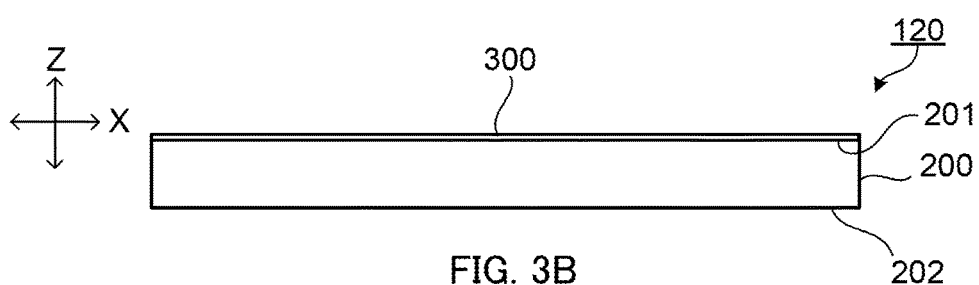
FIG. 3B is a front view of the emitter.
Figure 3C:
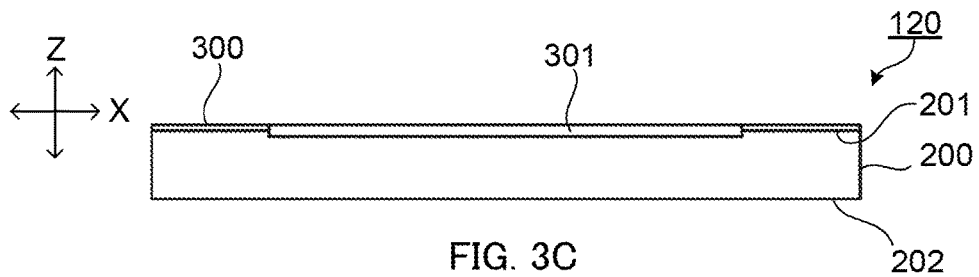
FIG. 3C is a back view of the emitter.
Figure 3D:
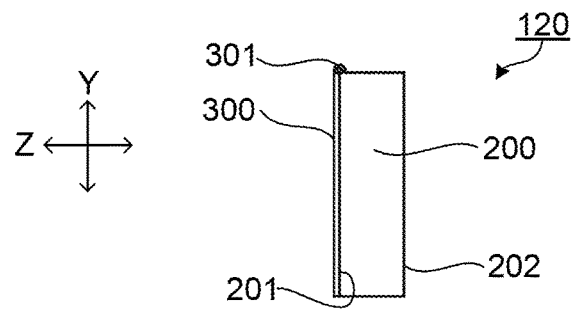
FIG. 3D is a side view of the emitter.
Figure 4:
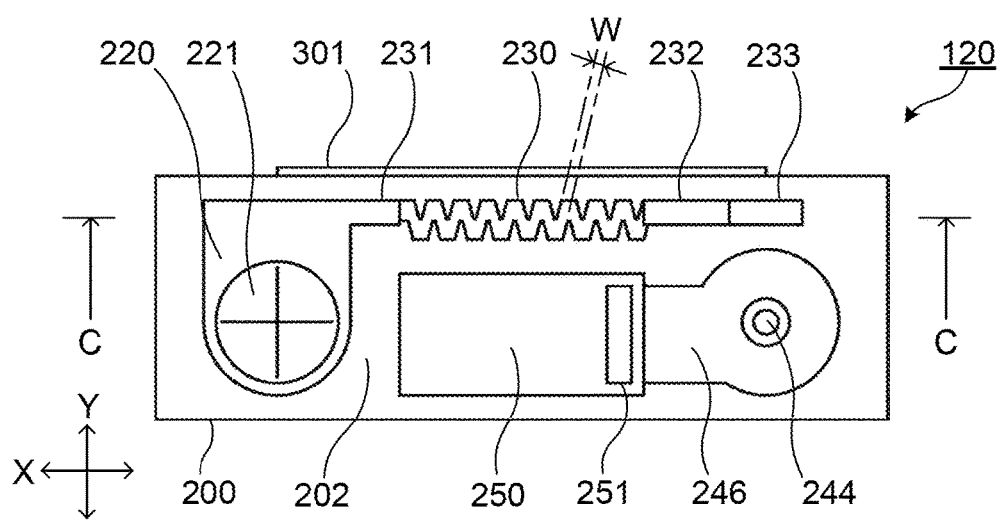
FIG. 4 is a bottom view of the emitter according to Embodiment 1.
Figure 5A:
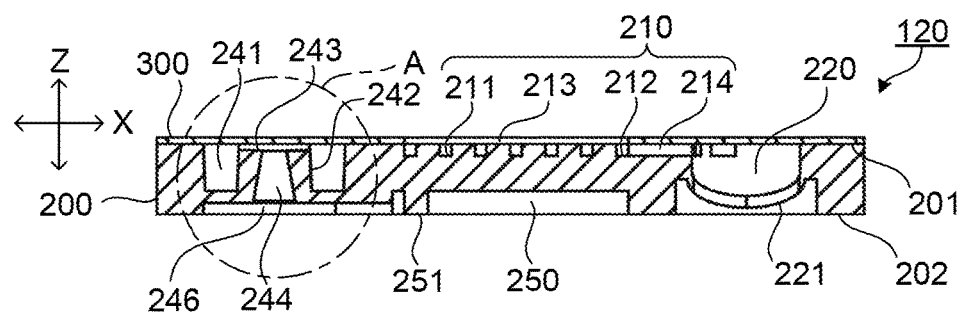
FIG. 5A is a sectional view of the emitter according to Embodiment 1 taken along line A-A of FIG. 3A.
Figure 5B:
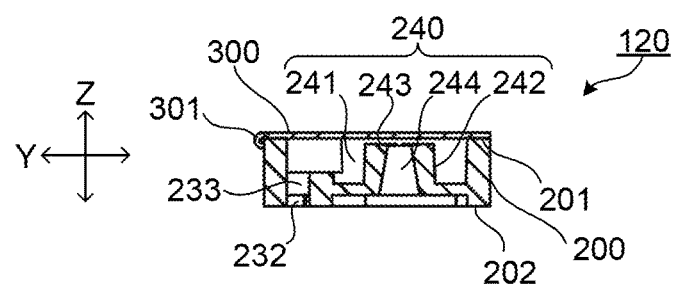
FIG. 5B is a sectional view of the emitter taken along line B-B of FIG. 3A.
Figure 5C:
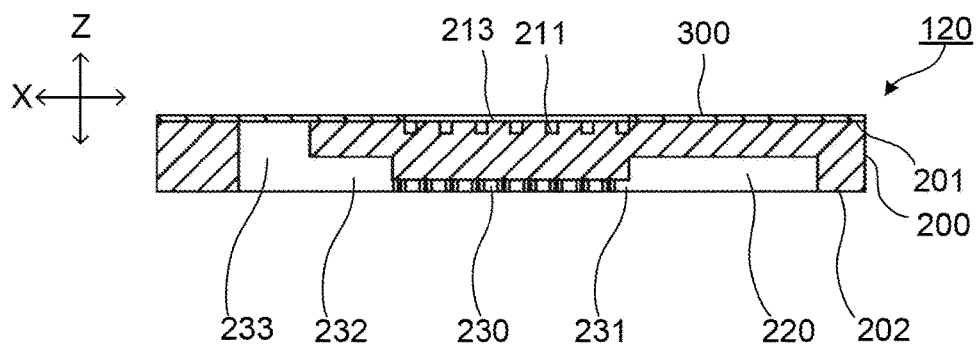
FIG. 5C is a sectional view of the emitter taken along line C-C of FIG. 4.

FIG. 2A illustrates a top surface, a front surface and a side surface of emitter 120, and FIG. 2B illustrates a bottom surface, a front surface and a side surface of emitter 120. FIG. 3A is a plan view of emitter 120, FIG. 3B is a front view of emitter 120, FIG. 3C is a back view of emitter 120, FIG. 3D is a side view of emitter 120, and FIG. 4 is a bottom view of emitter 120. FIG. 5A is a sectional view of emitter 120 taken along line A-A of FIG. 3A, FIG. 5B is a sectional view of emitter 120 taken along line B-B of FIG. 3A, and FIG. 5C is a sectional view of emitter 120 taken along line C-C of FIG. 4. It is to be noted that the X direction is the axial direction of tube 110 or the longitudinal direction of emitter 120, the Y direction is the short (width) direction of emitter 120, and the Z direction is the height direction of emitter 120.

As illustrated in FIG. 2A and FIG. 2B, emitter 120 has a rectangular external shape. For example, the length of emitter 120 is 30 mm in the X direction, 10 mm in the Y direction, and 3 mm in the Z direction. Emitter 120 includes emitter main body 200 to be joined to the inner wall surface of tube 110, and film 300 which is formed integrally with emitter main body 200.

Figure 7A:
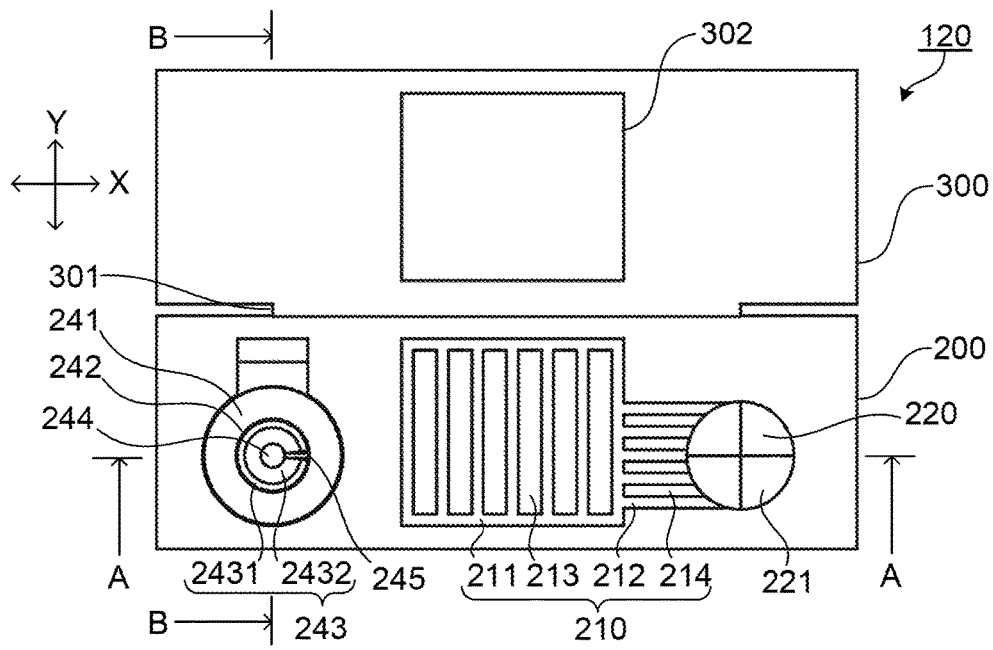
FIG. 7A is a plan view of the emitter of Embodiment 1 in the state before the film is joined to the emitter main body.
Figure 7B:
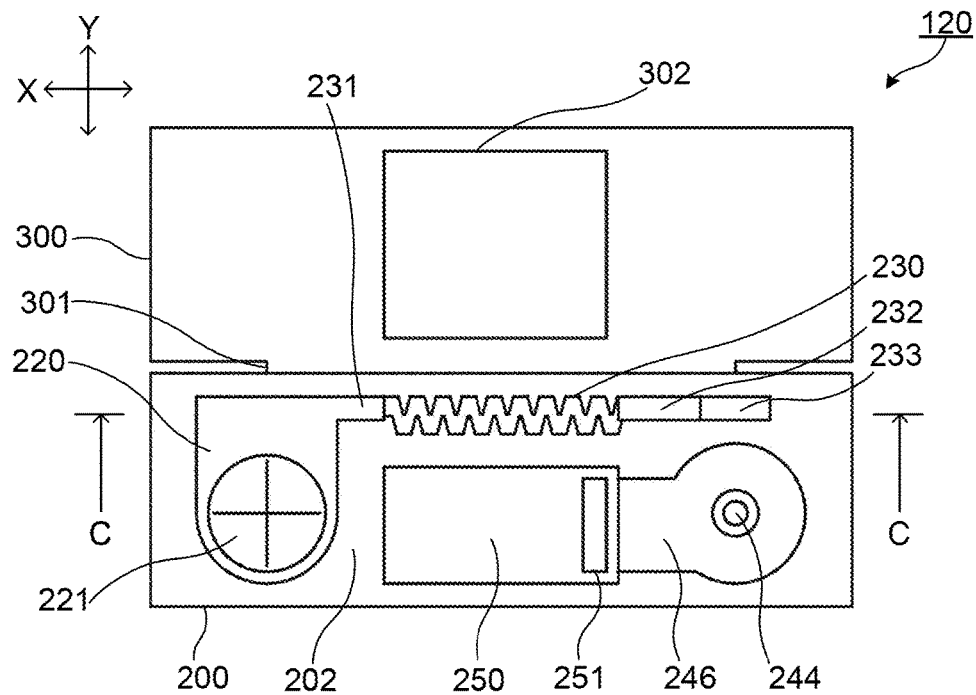
FIG. 7B illustrates a bottom view of the emitter.
Figure 8A:
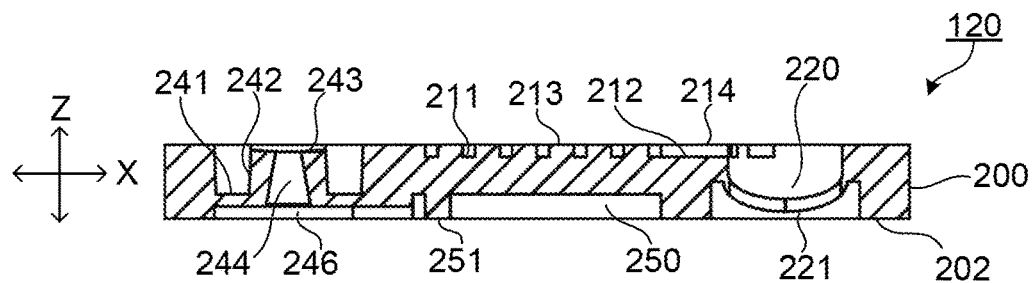
FIG. 8A is a sectional view of the emitter of Embodiment 1 taken along line A-A of FIG. 7A in the state before the film is joined to the emitter main body.
Figure 8B:
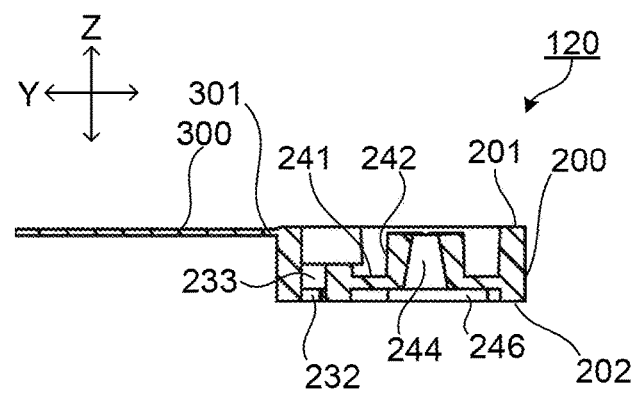
FIG. 8B is a sectional view of the emitter taken along line B-B of FIG. 7A.
Figure 8C:
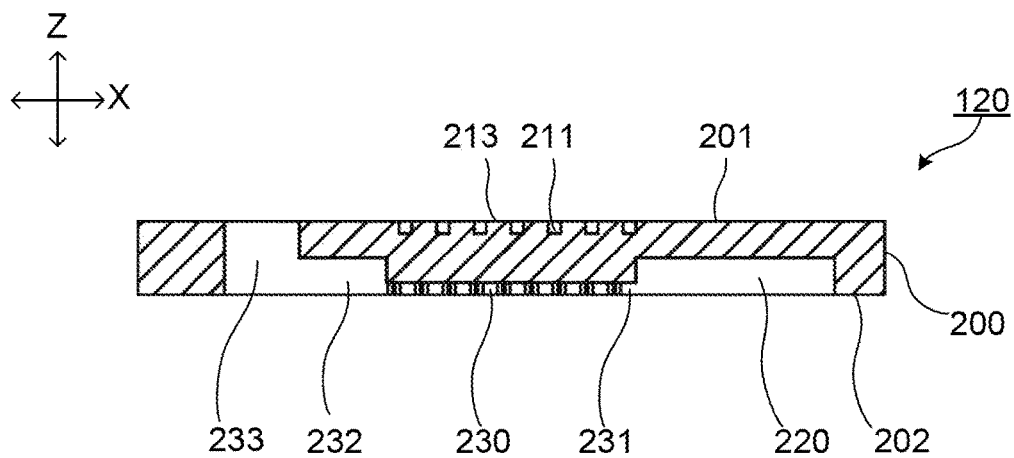
FIG. 8C is a sectional view of the emitter taken along line C-C of FIG. 7B.

FIG. 6A illustrates a top surface, a front surface and a side surface of emitter 120 in the state before film 300 is joined to emitter main body 200, and FIG. 6B illustrates a bottom surface, a front surface and a side surface of emitter 120. FIG. 7A is a plan view of emitter 120 in the state before film 300 is joined to emitter main body 200, and FIG. 7B is a bottom view of emitter 120. FIG. 8A is a sectional view of emitter 120 taken along line A-A of FIG. 7A in the state before film 300 is joined to emitter main body 200, FIG. 8B is a sectional view of emitter 120 taken along line B-B of FIG. 7A, and FIG. 8C is a sectional view of emitter 120 taken along line C-C of FIG. 7B.

As illustrated in FIG. 3B and FIG. 3C, emitter main body 200 includes first surface 201 and second surface 202. First surface 201 is one surface which is joined to film 300 in the Z direction. Second surface 202 is the other surface which is joined to the inner wall surface of tube 110 in the Z direction.

As illustrated in FIG. 5A, FIG. 5B and FIG. 5C, emitter main body 200 includes filter part 210 formed on first surface 201, water collecting part 220 which extends through emitter main body 200 in the Z direction, pressure reduction channel 230 formed on second surface 202, flow rate control part 240 which opens at first surface 201, and discharge part 250 formed on second surface 202.

As illustrated in FIG. 6A and FIG. 7A, filter part 210 includes first recess 211 which is formed on first surface 201 and has a rectangular shape as the shape viewed from the Z direction (hereinafter also referred to as "shape in plan view"), second recess 212 which is formed on first surface 201 and connects first recess 211 and water collecting part 220 together, a plurality of first protrusion lines 213 which are arranged side by side in the X direction in first recess 211 such that the longitudinal direction thereof is aligned with the Y direction, and a plurality of second protrusion lines 214 which are arranged side by side in the Y direction in second recess 212 such that the longitudinal direction thereof is aligned with the X direction. A gap is formed between first protrusion line 213 and the wall surface of first recess 211 in the Y direction, and a gap is formed between an end portion of second protrusion line 214 in the X direction and first protrusion line 213 adjacent to second protrusion line 214 in the X direction. The distance between the bottom surface of first recess 211 and second recess 212 to the tip end surface of first protrusion line 213 and second protrusion line 214 (the height of first protrusion line 213 and second protrusion line 214) is, for example, 0.5 mm The opening shape of water collecting part 220 at first surface 201 is a circle as illustrated in FIG. 7A. The opening diameter of water collecting part 220 is equal to the length of second recess 212 in the Y direction, and is, for example, 5 mm. As illustrated in FIG. 7B, the opening shape of water collecting part 220 at second surface 202 is a shape (bell shape) which is formed with a semicircle of the above-mentioned circle and a rectangular which has a width of the diameter of the opening and extends in the Y direction from the diameter of the semicircle.

As illustrated in FIG. 6A and FIG. 6B, water collecting part 220 includes flow rate adjustment valve 221. Flow rate adjustment valve 221 is composed of four flexible opening-closing parts which cover the circular opening of water collecting part 220. The opening-closing parts has a form in which a substantially himisphere thin dome protruding from first surface 201 side toward second surface 202 side is divided with slits in a cross shape. The opening-closing part has a thickness of, for example, 0.5 mm, and, normally, the slit has a width of, for example, 0 mm As illustrated in FIG. 4, pressure reduction channel 230 is formed as a groove on second surface 202. Pressure reduction channel 230 has a zigzag shape in plan view. In the zigzag shape, substantially triangular protrusions protruding from the side surface of pressure reduction channel 230 are alternately disposed along the longitudinal direction of pressure reduction channel 230. The protrusions are disposed such that the tip of each protrusion does not exceed the central axis of pressure reduction channel 230 in plan view. The above-mentioned groove has a depth of, for example, 0.5 mm, and the above-mentioned groove has a width (W in FIG. 4) of, for example, 0.5 mm As illustrated in FIG. 4, one end of pressure reduction channel 230 is connected with water collecting part 220 with linear groove 231 formed on second surface 202, and the other end of pressure reduction channel 230 is connected with linear groove 232 formed on second surface 202. Further, groove 232 is connected with flow rate control part 240 with through hole 233 which extends through emitter main body 200 from groove 232 and opens to first surface 201 as illustrated in FIG. 5B and FIG. 5C. Grooves 231 and 232, and through hole 233 have a width (the length in the Y direction) of, for example, 1 mm As illustrated in FIG. 6A, flow rate control part 240 includes recess 241, protrusion 242, end surface 243, hole 244 and groove 245.

As illustrated in FIG. 6A, recess 241 is a bottomed recess which is provided with an opening part at first surface 201 and is connected with through hole 233. In plan view, the opening part has a key-hole like shape composed of a combination of a circle and a rectangular. The rectangular is a recess which is shallow relative to recess 241, and the rectangular recess is connected with through hole 233, whereby through hole 233 and recess 241 are in communication with each other. The circular shape of the opening part has a diameter of, for example, 6 mm. When the opening part is sealed with film 300, recess 241 forms a part of a channel of irrigation liquid on the downstream side relative to pressure reduction channel 230. The distance from the bottom of recess 241 to first surface 201 in the Z direction (the depth of recess 241) is, for example, 2 mm As illustrated in FIG. 5A and FIG. 5B, protrusion 242 is a substantially cylindrical thick body which is provided in an upright manner. Protrusion 242 includes, at an end thereof, end surface 243 which is disposed at a position where end surface 243 does not make contact with film 300 when the opening part is sealed.

Figure 9A:
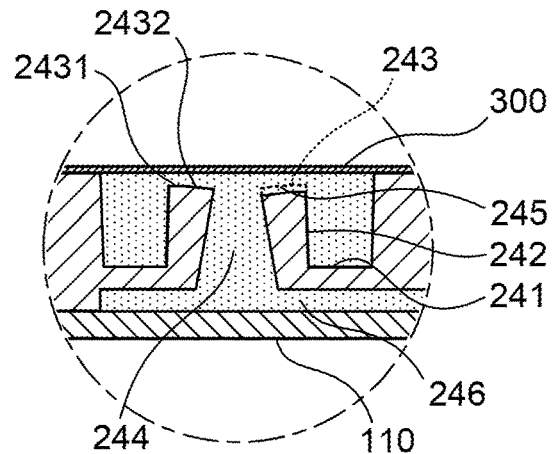
FIG. 9A illustrates part A of FIG. 5A in an enlarged manner in the case where the pressure of the irrigation liquid in the tube is equal to or higher than the first pressure value and is lower than the second pressure value.

As illustrated in FIG. 7A, end surface 243 has a circular shape in plan view, and the diameter thereof is, for example, 3 mm End surface 243 includes outer ring part 2431 which is parallel to the XY plane, and tilted surface 2432 which is tilted to second surface 202 side from the inner periphery edge of outer ring part 2431 toward hole 244 (FIG. 9A). The distance from outer ring part 2431 to film 300 in the Z direction is, for example, 0.25 mm.

Figure 9B:
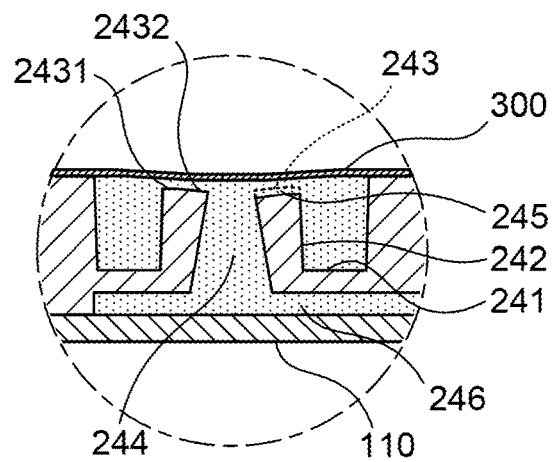
FIG. 9B illustrates part A of FIG. 5A in an enlarged manner in the case where the pressure of the irrigation liquid in the tube is equal to or higher than the second pressure value and is lower than the third pressure value.
Figure 9C:
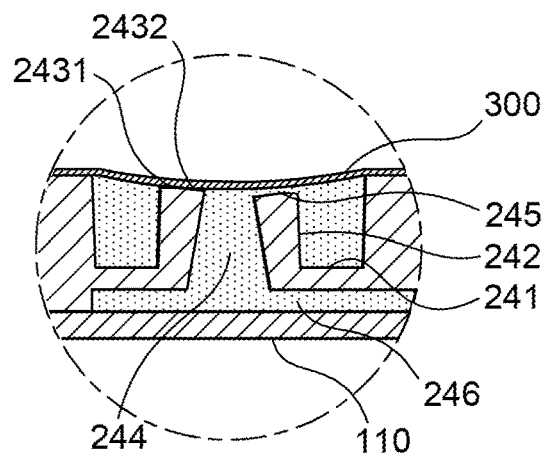
FIG. 9C illustrates part A of FIG. 5A in an enlarged manner in the case where the pressure of the irrigation liquid in the tube is equal to or higher than the third pressure value.

Tilted surface 2432 is a curved surface which is slightly depressed with respect to first surface 201 side. Tilted surface 2432 coincides with a virtual curve, which is formed between the opening edges of the opening part of recess 241 and is in contact with the opening edges in a cross-section including the central axis of hole 244 of emitter main body 200. The virtual curve includes a curve which is defined by film 300 when film 300 receives a pressure of the irrigation liquid in tube 110 having a value equal to or higher than a predetermined value in the above-mentioned cross-section (FIG. 9A and FIG. 9C). The curve has a curvature radius R of, for example, 12 mm As illustrated in FIG. 5A, hole 244 opens at a center of end surface 243, extends through protrusion 242, and opens at recess 246 formed on second surface 202. That is, hole 244 communicates between recess 241 and recess 246. The hole diameter of hole 244 on end surface 243 side is, for example, 1 mm. The opening on end surface 243 side of hole 244 is smaller than that of the opening on recess 246 side. That is, hole 244 is a tapered hole whose diameter gradually increases from end surface 243 side toward recess 246 side in the Z direction.

In plan view, recess 246 has a key-hole like shape composed of a combination of a circle with the opening of hole 244 at a center portion thereof and a rectangular having a width smaller than the diameter of the circle as illustrated in FIG. 4.

As illustrated in FIG. 6A, groove 245 is a groove extending from the outer peripheral edge of end surface 243 to hole 244. That is, groove 245 communicates between recess 241 and hole 244. One or more grooves 245 may be provided. For example, groove 245 has a width of 2 mm, and a depth of 0.05 mm As illustrated in FIG. 2B and FIG. 4, discharge part 250 is formed on second surface 202 as a recess which is continuous to recess 246 in the X direction and is deep relative to recess 246. In plan view, discharge part 250 has a rectangular shape. At the connecting part of recess 246 and the discharge part, the length of discharge part 250 is greater than that of recess 246 in the Y direction.

As illustrated in FIG. 4, slender protrusion line 251 is disposed along the Y direction in discharge part 250. As illustrated in FIG. 5A, protrusion line 251 protrudes to second surface 202 from the bottom of the recess forming discharge part 250. As illustrated in FIG. 4, in the X direction, protrusion line 251 is disposed at a position away from recess 246, and, in the Y direction, the length of protrusion line 251 is smaller than that of discharge part 250 and is substantially equal to that of recess 246 at the connecting part. As described, as viewed from discharge part 250 side along the X direction, protrusion line 251 is disposed at a position where protrusion 251 overlaps recess 246.

As illustrated in FIG. 7A and FIG. 7B, film 300 is disposed integrally with emitter main body 200 through hinge part 301. Hinge part 301 is disposed at an edge of first surface 201 of emitter main body 200 in the Y direction. For example, hinge part 301 is a portion having a thickness equal to that of film 300 and a width of 0.5 mm, and is formed integrally with emitter main body 200 and film 300.

As illustrated in FIG. 7A and FIG. 7B, film 300 further includes rectangular opening part 302 at a position corresponding to first recess 211 of filter part 210 in the state where film 300 covers first surface 201. For example, the thickness of film 300 may be determined by a computer simulation or an experiment using a trial product or the like on the basis of the deformation amount under a pressure described later, and may be, for example, 0.15 mm Each of emitter main body 200 and film 300 is molded with one material having flexibility such as polypropylene, for example. Examples of the material include resin and rubber, and examples of the resin include polyethylene and silicone. The flexibility of emitter 120 and film 300 can be adjusted with use of elastic resin materials, and for example, can be adjusted by the type of an elastic resin, the mixing ratio of an elastic resin material to a hard resin material, and the like. Emitter 120 can be manufactured as an integrally molded member by injection molding, for example.

(Operation)

Film 300 turns about hinge part 301, and is closely joined on first surface 201 of emitter main body 200. For example, the joining is performed by welding of a resin material of emitter main body 200 or film 300, by bonding using an adhesive agent, by pressure bonding of film 300 to emitter main body 200 or the like. When film 300 is joined to first surface 201, a channel extending from filter part 210 to water collecting part 220 is formed, and recess 241 is liquid-tightly sealed with film 300.

Second surface 202 is joined to the inner wall surface of tube 110. The joining is performed by welding of the resin material of emitter main body 200 or tube 110, by bonding using adhesive agent, by pressure bonding of emitter main body 200 to tube 110, or the like. When emitter 120 is joined to tube 110, water collecting part 220, pressure reduction channel 230, flow rate control part 240 and discharge part 250 are configured to exhibit their desired functions. Normally, emitter 120 is joined to the inner periphery wall of tube 110 before discharge port 130 is formed, and thereafter, discharge port 130 is formed at a position corresponding to discharge part 250 of tube 110. Alternatively, emitter 120 may be joined to the inner wall surface of tube 110 such that emitter 120 is located at the position of preliminarily provided discharge port 130.

Next, discharge of irrigation liquid by emitter 120 is described. FIG. 9A illustrates part A of FIG. 5A in an enlarged manner in the case where the pressure of the irrigation liquid in tube 110 is equal to or higher than a first pressure value and lower than a second pressure value. FIG. 9B illustrates part A of FIG. 5A in an enlarged manner in the case where the pressure of the irrigation liquid in tube 110 is equal to or higher than the second pressure value and lower than a third pressure value. FIG. 9C illustrates part A of FIG. 5A in an enlarged manner in the case where the pressure of the irrigation liquid in tube 110 is equal to or higher than the third pressure value.

Supply of irrigation liquid to trickle irrigation tube 100 is performed in a range where the pressure of the irrigation liquid does not exceed 0.1 MPa for the purpose of preventing damaging of tube 110 and emitter 120. When irrigation liquid is supplied into tube 110, the irrigation liquid reaches second recess 212 covered with film 300 in the Z direction through a gap between first recess 211 and first protrusion line 213 of filter part 210 and reaches water collecting part 220 through a gap between second recess 212 and second protrusion line 214. Filter part 210 prevents intrusion of float in the irrigation liquid having a size greater than the gap.

When the pressure of the irrigation liquid in tube 110 is equal to or higher than the first pressure value (for example, 0.005 MPa), flow rate adjustment valve 221 is pushed to second surface 202 side, and the slit of flow rate adjustment valve 221 is expanded. In this manner, the irrigation liquid reaching water collecting part 220 is received by emitter main body 200 from water collecting part 220. Flow rate adjustment valve 221 suppresses inflow of the irrigation liquid to emitter main body 200 when the pressure of the irrigation liquid is lower than the first pressure. Thus, high-pressure supply of the irrigation liquid to tube 110 can be achieved, and therefore the configuration where emitter 120 has flow rate adjustment valve 221 is favorable for forming trickle irrigation tube 100 having a greater length, for example.

The irrigation liquid received from water collecting part 220 is supplied to pressure reduction channel 230 through groove 231. The pressure of the irrigation liquid flowing through pressure reduction channel 230 is reduced as a result of pressure reduction caused by the shape (zigzag shape) in plan view of reduction channel 230. In addition, floats in the irrigation liquid are entangled in the turbulent flow generated between the protrusions of pressure reduction channel 230 and are retained in pressure reduction channel 230. In this manner, the floats are further removed from the irrigation liquid by pressure reduction channel 230.

The irrigation liquid having passed through pressure reduction channel 230 in which the pressure is reduced and the floats are removed is supplied into recess 241 of flow rate control part 240 through groove 232 and hole 233. When recess 241 is filled with the irrigation liquid, the irrigation liquid is supplied to hole 244 of protrusion 242 through a gap between film 300 and end surface 243 as illustrated in FIG. 9A.

The irrigation liquid having passed through hole 244 reaches recess 246 and discharge part 250, and is discharged out of tube 110 through discharge port 130 which opens to discharge part 250.

While foreign matters of soil or the like may enter discharge part 250 from discharge port 130, intrusion of the foreign matters to recess 246 is blocked by protrusion lines 251 of discharge part 250.

As the pressure of the irrigation liquid in tube 110 increases, the flow rate of the irrigation liquid flowing into emitter main body 200 from water collecting part 220 increases, and the discharge rate of the irrigation liquid from discharge port 130 increases.

When the pressure of the irrigation liquid in tube 110 is equal to or higher than the second pressure value (for example, 0.02 MPa), film 300 pushed by the irrigation liquid in tube 110 is deflected as illustrated in FIG. 9B. Consequently, the distance between film 300 and end surface 243 at flow rate control part 240 is reduced. For example, the distance between end surface 243 and film 300 is changed to 0.15 mm Thus, the amount of the irrigation liquid which passes through flow rate control part 240 is reduced, and the increase of the discharge rate of the irrigation liquid from discharge port 130 is suppressed.

When the pressure of the irrigation liquid in tube 110 is equal to or higher than the third pressure value (for example, 0.05 MPa), film 300 pushed by the irrigation liquid in tube 110 is further deflected, and is brought into close contact with end surface 243 (tilted surface 2432) of protrusion 242 as illustrated in FIG. 9C. In this manner, film 300 functions as a valve element for sealing a hole which is a channel of the irrigation liquid under high pressure, and end surface 243 functions as a valve seat of the valve element. Meanwhile, since groove 245 is not sealed even when film 300 makes close contact with end surface 243, the irrigation liquid supplied to recess 241 is supplied from recess 241 to hole 244 through groove 245. Consequently, the amount of the irrigation liquid which passes through flow rate control part 240 is restricted to a flow rate which can pass through groove 245, and the discharge rate of the irrigation liquid from discharge port 130 becomes substantially constant. In this manner, emitter 120 quantitatively discharges the irrigation liquid from tube 110 supplied with the irrigation liquid.

(Effect)

As described above, emitter 120 includes water collecting part 220 for receiving the irrigation liquid in tube 110, pressure reduction channel 230 for allowing the irrigation liquid received from water collecting part 220 to flow therethrough while reducing the pressure of the irrigation liquid, flow rate control part 240 for controlling the flow rate of the irrigation liquid supplied from pressure reduction channel 230 in accordance with the pressure of the irrigation liquid in tube 110, and discharge part 250 to which the irrigation liquid having a flow rate controlled by flow rate control part 240 supplied, discharge part 250 facing discharge port 130. Water collecting part 220 opens at first surface 201 of emitter main body 200. Flow rate control part 240 includes an opening part which opens at first surface 201, film 300 having flexibility which seals the opening part and blocks communication between a channel on the downstream side relative to pressure reduction channel 23 and the inside of tube 110, a recessed surface part (tilted surface 2432) depressed with respect to film 300 and disposed at a channel on a downstream side relative to pressure reduction channel 230 such that the recessed surface part faces film 300 without making contact with film 300, but the recessed surface part being capable of making close contact with film 300; hole 244 opening at the recessed surface part and communicated with discharge part 250, and groove 245 formed on the recessed surface part and configured to communicate between hole 244 and the channel on outside relative to the recessed surface part. When emitter 120 is disposed to the inner wall surface of tube 110 at a position corresponding to discharge port 130 of tube 110, trickle irrigation tube 100 is formed. Film 300 starts to deflect when the pressure of the irrigation liquid in tube 110 is equal to or higher than the above-mentioned second pressure value, and film 300 makes close contact with the recessed surface part when the pressure is equal to or higher than the third pressure value. Therefore, emitter 120 discharges the irrigation liquid such that the amount of the liquid is limited to the amount which passes through groove 245 even when the pressure of the irrigation liquid in tube 110 increases. In this manner, emitter 120 quantitatively discharges the irrigation liquid in tube 110 from discharge port 130 in accordance with the pressure of the irrigation liquid in tube 110, and thus can stabilize the discharge rate of the irrigation liquid.

Further, since the above-described components of emitter 120 are composed of a recess or a through hole formed on first surface 201 or second surface 202 of emitter main body 200, emitter main body 200 can be integrally produced by injection molding. Therefore, emitter 120 can further reduce manufacturing cost in comparison with conventional emitters composed of three parts.

In addition, with the configuration in which emitter 120 is molded with one material having flexibility and film 300 is integrally molded as a part of emitter 120 such that film 300 can close recess 241, both of emitter main body 200 and film 300 can be molded as one component by injection molding, and consequently manufacturing error of the joining position of film 300 can be prevented, which is further favorable from the standpoint of further reducing manufacturing cost, for example.

In addition, with the configuration in which water collecting part 220 further includes water flow rate adjustment valve 221 configured to expand the irrigation liquid channel at collecting part 220 in accordance with the increase of the pressure of the irrigation liquid in tube 110, the irrigation liquid can be supplied to tube 110 with a higher pressure, which is further favorable from the viewpoint of forming trickle irrigation tube 100 having a greater length.

(Modification)

In trickle irrigation tube 100, the above-described configurations may be partially changed, or other configurations may be additionally provided as long as the above-described effect is achieved.

For example, tube 110 may be a seamless tube, or a tube composed of slender sheet(s) joined together along the longitudinal direction.

In addition, discharge port 130 may be a gap formed at the above-mentioned joining part of the sheet(s) so as to communicate between the inside and the outside of tube 110, or a pipe sandwiched by the sheets at the joining part. Further, the shape of the discharge port in the axial direction may not be a straight line shape. Examples of the tube having the discharge port include a tube in which a depression having a desired shape and serving as a channel is formed on the surface of the above-mentioned sheet(s), and a discharge port composed of the channel is formed at the joining part when the sheets are joined together.

While water collecting part 220 is located at a position on the upstream side in the flow direction of the irrigation liquid in tube 110, water collecting part 220 may be located at a position on the downstream side. In addition, the orientations of a plurality of emitters in one tube 110 may be identical to each other or different from each other.

In addition, the resin material of emitter main body 200 and the resin material of film 300 may be identical to each other or different from each other.

While emitter main body 200 is integrally by injection molding of resin, emitter main body 200 may be composed of two components of a first surface 201 side component and a second surface 202 side component. In this case, the first surface 201 side component is integrally molded with film 300. With the configuration in which emitter main body 200 is composed of the two components, a channel such as a pressure reduction channel can be disposed inside emitter main body 200. It is to be noted that the two components may be integrally molded through a hinge part.

In addition, pressure reduction channel 230 may be a groove on first surface 201 which is covered with film 300 in emitter main body 200.

While the recessed surface part is tilted surface 2432 in the present embodiment, other suitable configurations may also be adopted as long as it can make close contact with film 300 at a position around hole 244. For example, the recessed surface part may be a planer part located at a position closer to second surface 202 side than first surface 201 in flow rate control part 240.

While second surface 202 is a planer surface in Embodiment 1, second surface 202 may also be a curved surface extending along the inner wall of tube 110 (for example, a surface formed of the arc of the internal diameter of tube 110 in YZ plane).

[Embodiment 2]

Now Embodiment 2 of the present invention is described.

(Configuration)

Figure 10:
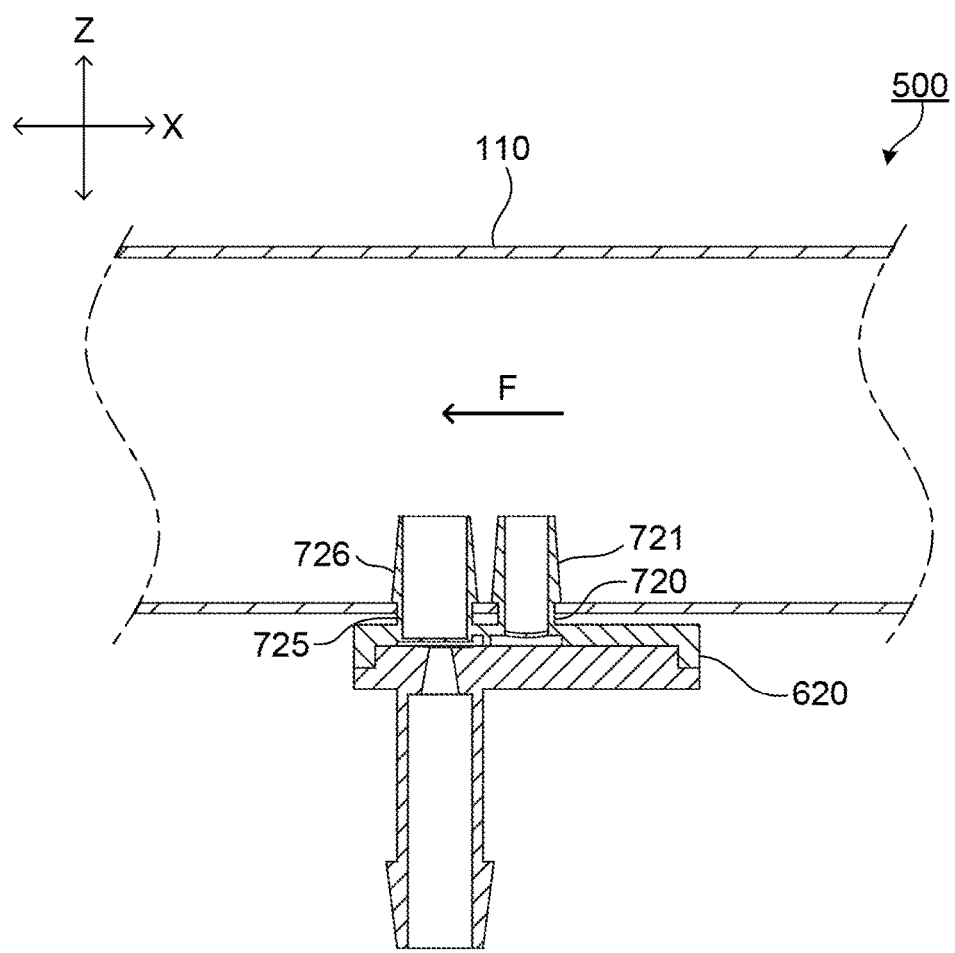
FIG. 10 is a schematic sectional view of a trickle irrigation tube according to Embodiment 2 of the present invention.

FIG. 10 is a schematic sectional view of trickle irrigation tube 500 according to Embodiment 2 of the present invention. Trickle irrigation tube 500 is composed of tube 110 and emitter 620. The configuration of tube 110 is identical to that of the above-described Embodiment 1.

Figure 11A:
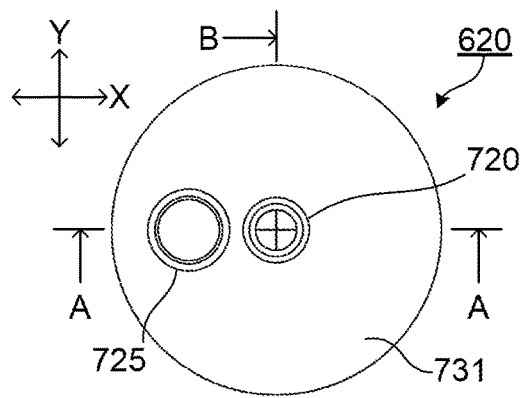
FIG. 11A is a plan view of an emitter according to Embodiment 2.
Figure 11B:
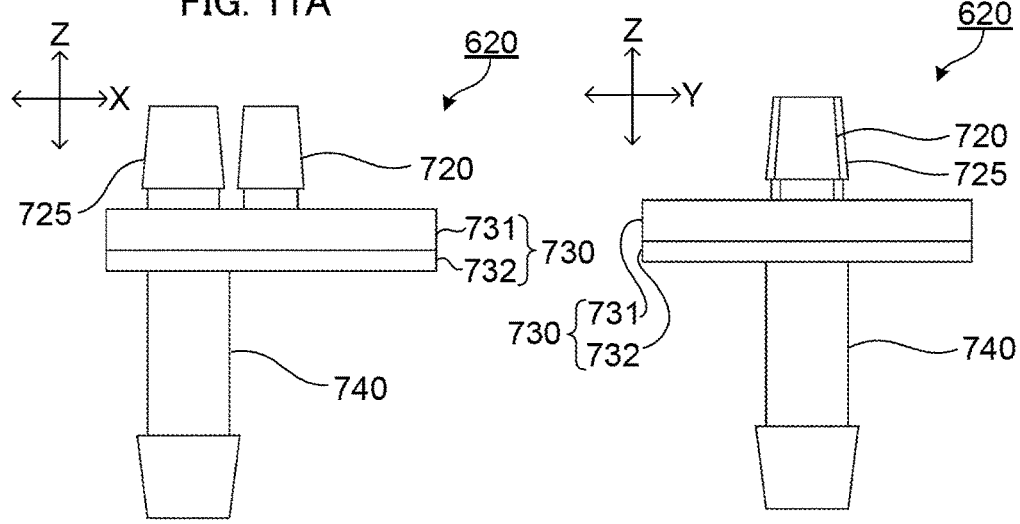
FIG. 11B is a front view of the emitter.
Figure 11D:
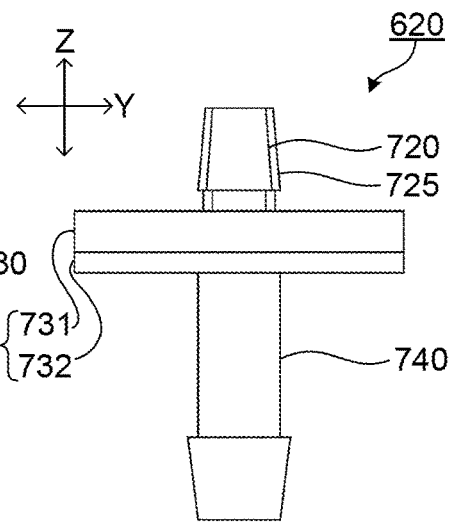
FIG. 11D is a side view of the emitter.
Figure 11C:
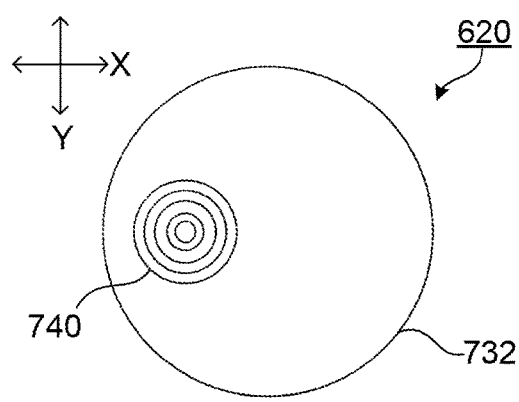
FIG. 11C is a bottom view of the emitter.
Figure 12A:
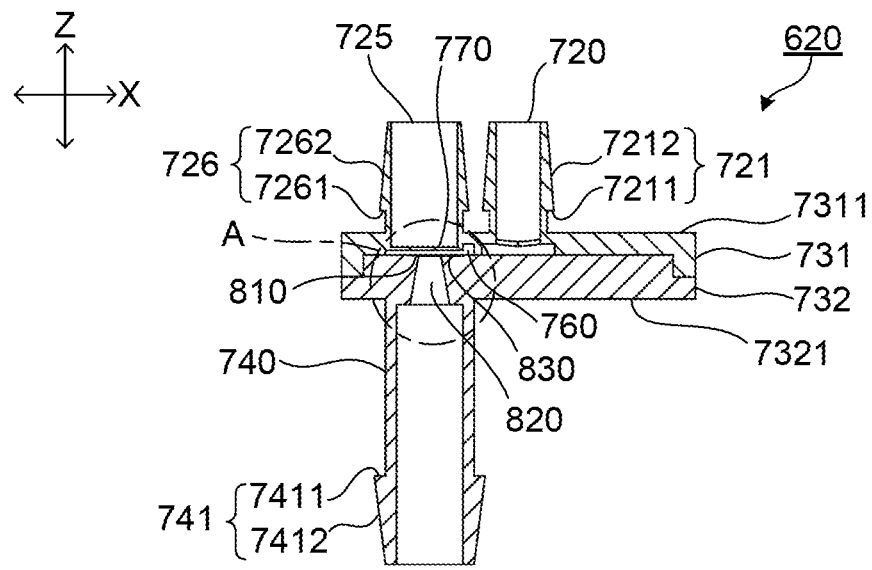
FIG. 12A is a sectional view of the emitter according to Embodiment 2 taken along line A-A of FIG. 11A.
Figure 12B:
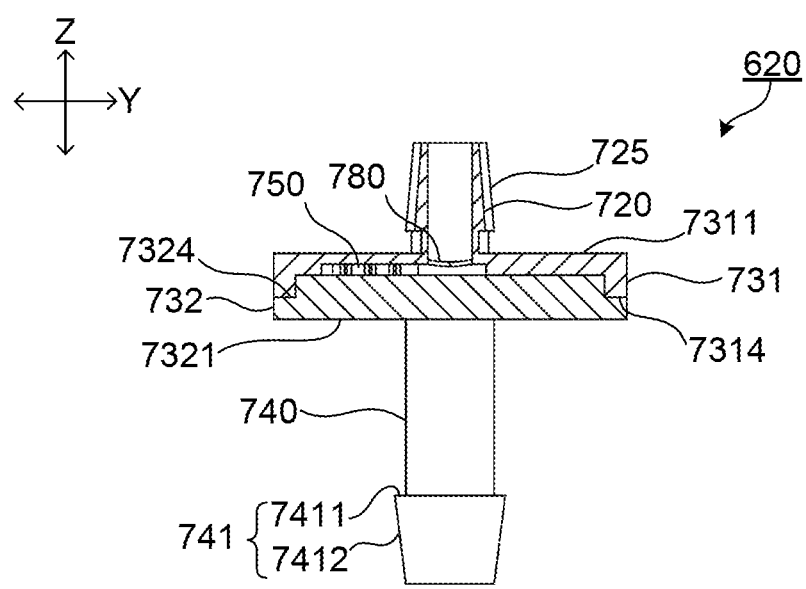
FIG. 12B is a sectional view of the emitter taken along line B-B of FIG. 11A.

FIG. 11A is a plan view of emitter 620, FIG. 11B is a front view of emitter 620, FIG. 11C is a bottom view of emitter 620, and FIG. 11D is a side view of emitter 620. In addition, FIG. 12A is a sectional view of emitter 620 taken along line A-A of FIG. 11A, and FIG. 12B is a sectional view of emitter 620 taken along line B-B of FIG. 11A.

As illustrated in FIG. 11B and FIG. 11C, emitter 620 includes water collecting part 720, pressure transfer pipe 725, flange part 730 and discharge part 740. Here, the Z direction is a direction along the axis of water collecting part 720, and includes a direction in which emitter 620 is inserted to tube 110. The X direction is one direction orthogonal to the Z direction, and the Y direction is a direction orthogonal to both of the Z direction and the X direction.

The shape viewed along the Z direction (shape in plan view) of flange part 730 is a circular shape. Flange part 730 has an outer diameter of, for example, 16 mm. As illustrated in FIG. 11A and FIG. 11B, water collecting part 720 is disposed at a center of flange part 730 in plan view, and pressure transfer pipe 725 and discharge part 740 are disposed at positions shifted in the X direction from a center of flange part 730 as illustrated in FIG. 11B, FIG. 11C and FIG. 11D.

Flange part 730 is composed of a combination of first disk part 731 on water collecting part 720 and pressure transfer pipe 725 side and second disk part 732 on discharge part 740 side. Water collecting part 720 and pressure transfer pipe 725 are formed integrally with first disk part 731, and discharge part 740 is formed integrally with second disk part 732. Hereinafter, the integrally molded member of water collecting part 720, pressure transfer pipe 725 and first disk part 731 is also referred to as "first component," and the integrally molded member of discharge part 740 and second disk part 732 is also referred to as "second component."

Figure 13A:
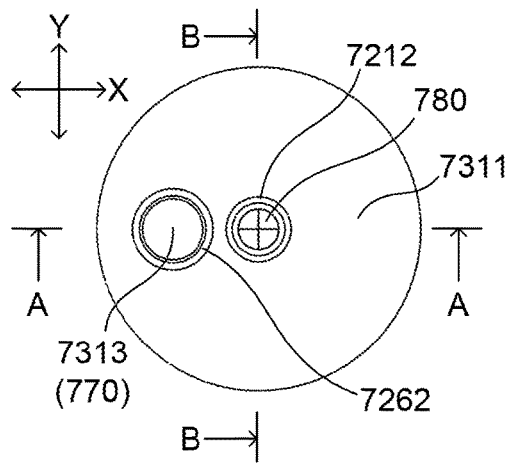
FIG. 13A is a plan view of a first component of Embodiment 2.
Figure 13B:
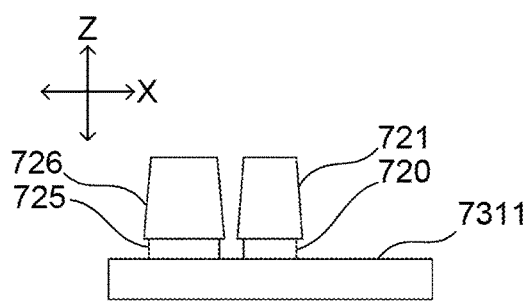
FIG. 13B is a front view of the first component.
Figure 13D:
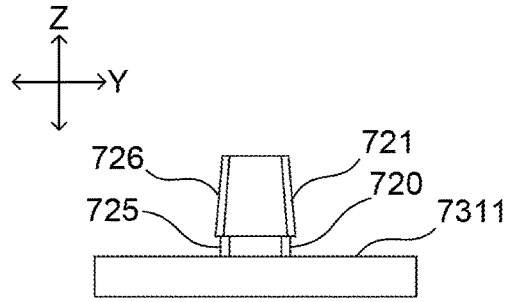
FIG. 13D is a side view of the first component.
Figure 13C:
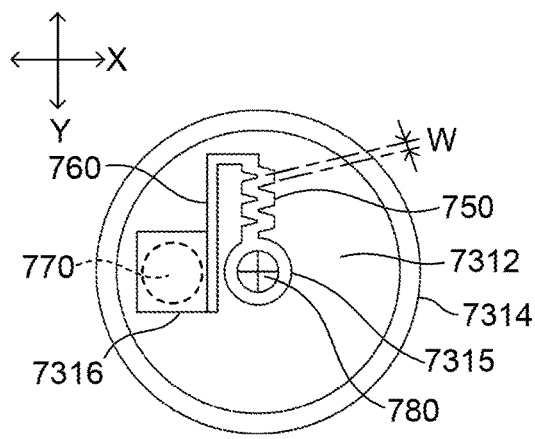
FIG. 13C is a bottom view of the first component.

As illustrated in FIG. 12A and FIG. 12B, water collecting part 720 is a cylindrical member uprightly provided on first surface 7311 of first disk part 731. Barb 721 is formed at an end portion of water collecting part 720. Barb 721 is composed of large diameter part 7211 which expands from the outer peripheral surface of water collecting part 720 along the XY plane, and tapered surface 7212 whose outer diameter gradually decreases from large diameter part 7211 toward an end of water collecting part 720. For example, large diameter part 7211 has an outer diameter of 3.2 mm, and the end of tapered surface 7212 has an outer diameter of 2.6 mm As with water collecting part 720, pressure transfer pipe 725 is a cylindrical member uprightly provided on first surface 7311 of first disk part 731 as illustrated in FIG. 12A and FIG. 12B. Barb 726 is formed at an end portion of pressure transfer pipe 725. Barb 726 is composed of large diameter part 7261 which expands from the outer peripheral surface of pressure transfer pipe 725 along the XY plane, and tapered surface 7262 whose outer diameter gradually decreases from large diameter part 7261 toward an end of pressure transfer pipe 725. For example, large diameter part 7261 has an outer diameter of 4 mm, and the end of tapered surface 7262 has an outer diameter of 3.3 mm FIG. 13A is a plan view of the first component, FIG. 13B is a front view of the first component, FIG. 13C is a bottom view of the first component, and FIG. 13D is a side view of the first component. In addition, FIG. 14A is a sectional view of the first component taken along line A-A of FIG. 13A, and FIG. 14B is a sectional view of the first component taken along line B-B of FIG. 13A.

As illustrated in FIG. 13A and FIG. 13C, first disk part 731 includes recess 7313 on first surface 7311 side, and protrusion line 7314, first recess 7315, pressure reduction channel 750, channel 760, second recess 7316 and flow rate adjustment valve 780 on second surface 7312 side which is an opposite side of first surface 7311 in the Z direction.

Figure 14A:
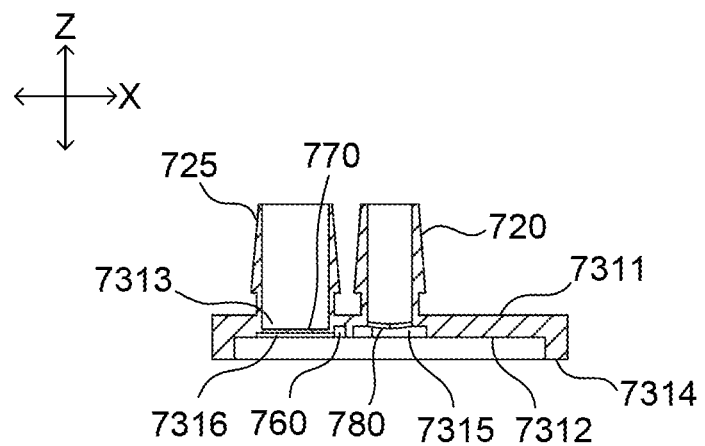
FIG. 14A is a sectional view of the first component of Embodiment 2 taken along line A-A of FIG. 13A.

As illustrated in FIG. 14A, recess 7313 is a recess formed on first surface 7311. In plan view, recess 7313 has a circular shape as illustrated in FIG. 13A. The bottom of recess 7313 composes film 770 described later. Recess 7313 has a diameter of, for example, 3 mm, and recess 7313 has a depth from first surface 7311 of, for example, 0.65 mm Pressure transfer pipe 725 is in communication with recess 7313.

Figure 14B:
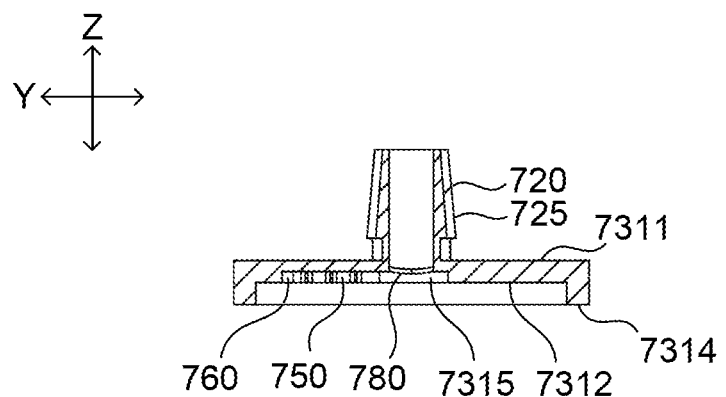
FIG. 14B is a sectional view of the first component taken along line B-B of FIG. 13A.

As illustrated in FIG. 13C, protrusion line 7314 is disposed at the peripheral portion of second surface 7312, and as illustrated in FIG. 14A and FIG. 14B, protrusion line 7314 protrudes from second surface 7312. The height of protrusion line 7314 from second surface 7312 is, for example, 1 mm As illustrated in FIG. 13C, first recess 7315 is formed at a center of second surface 7312. In plan view, first recess 7315 has a circular shape. First recess 7315 is in communication with the inside of water collecting part 720, and the diameter of first recess 7315 is slightly larger than the internal diameter of water collecting part 720. The depth of first recess 7315 from second surface 7312 is, for example, 0.5 mm As illustrated in FIG. 14B, pressure reduction channel 750 is a portion formed as a groove on second surface 7312. As illustrated in FIG. 13C, pressure reduction channel 750 is connected with first recess 7315, and extends toward the peripheral portion of second surface 7312 along the radial direction of second surface 7312. In plan view, pressure reduction channel 750 has a zigzag shape as with the above-described pressure reduction channel 230, and pressure reduction channel 750 has a width (W in FIG. 13C) of, for example, 0.45 mm As illustrated in FIG. 14A and FIG. 14B, channel 760 is formed as a groove on second surface 7312. As illustrated in FIG. 13C, at the peripheral portion of second surface 7312, the base end of channel 760 is connected with pressure reduction channel 750, and channel 760 extends along the extending direction of pressure reduction channel 750. While an end of channel 760 is extended to a region near first recess 7315, the end portion of channel 760 and first recess 7315 are not in communication with each other.

As illustrated in FIG. 14A, second recess 7316 is a recess formed on second surface 7312. As illustrated in FIG. 13C, second recess 7316 is adjacent to an end portion of channel 760, and has a rectangular shape in plan view. In the Z direction, second recess 7316 overlaps recess 7313 on first surface 7311 side, and this overlapping part is thin film 770. Accordingly, film 770 has a circular shape in plan view. The depth of second recess 7316 from second surface 7312 is, for example, 0.2 mm, and the thickness of film 770 is, for example, 0.15 mm. The thickness of film 770 is determined by a computer simulation or an experiment using a trial product or the like on the basis of the deformation amount under a pressure described later, for example.

Figure 15A:
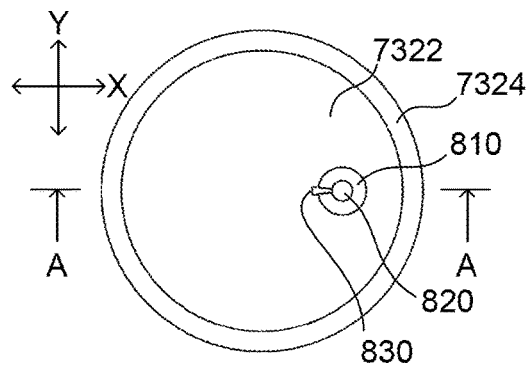
FIG. 15A is a plan view of a second component of Embodiment 2.
Figure 15B:
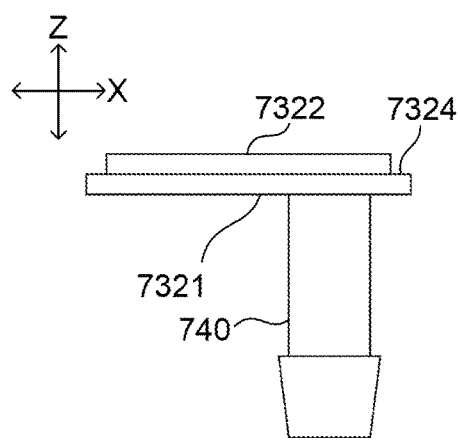
FIG. 15B is a front view of the second component.
Figure 15D:
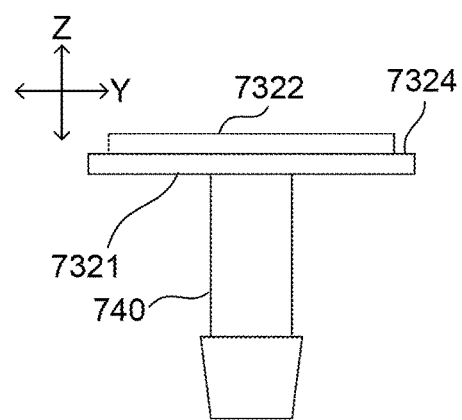
FIG. 15D is a side view of the second component.
Figure 15C:
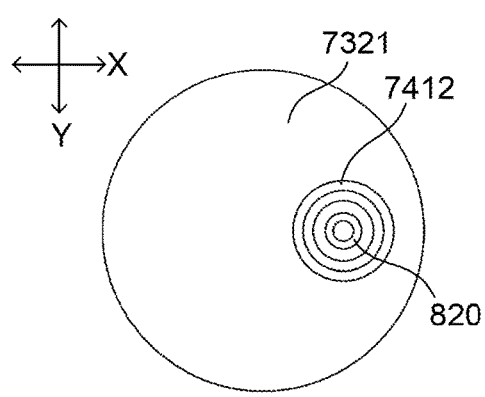
FIG. 15C is a bottom view of the second component.
Figure 15E:
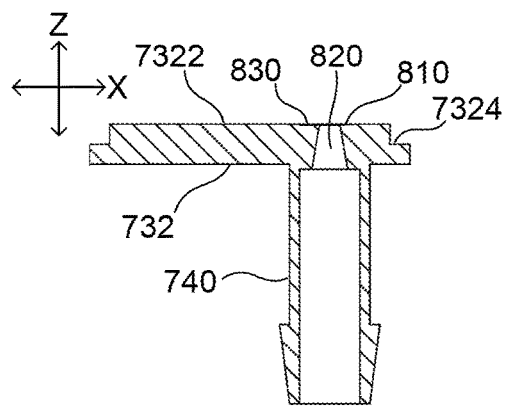
FIG. 15E is a sectional view of the second component taken along line A-A of FIG. 15A.

As with the above-described flow rate adjustment valve 221, flow rate adjustment valve 780 is composed of four opening-closing parts. As illustrated in FIG. 13C, FIG. 14A and FIG. 14B, the opening-closing part has a form similar to the form in which a substantially himisphere thin dome protruding from the inner base end of water collecting part 720 toward first recess 7315 is divided with slits in a cross shape. The slit has a width of, for example, 0 mm, and the opening-closing part has a thickness of, for example, 0.2 mm As illustrated in FIG. 12A, discharge part 740 is a cylindrical member uprightly provided on first surface 7321 of second disk part 732. As with water collecting part 720, barb 741 is formed at an end portion of discharge part 740. Barb 741 is composed of large diameter part 7411 which expands from the outer peripheral surface of discharge part 740 along XY plane, and tapered surface 7412 whose outer diameter gradually decreases from large diameter part 7411 toward an end of discharge part 740. For example, large diameter part 7411 has an outer diameter of 5 mm, and the end of tapered surface 7412 has an outer diameter of 4 mm FIG. 15A is a plan view of the second component, FIG. 15B is a front view of the second component, FIG. 15C is a bottom view of the second component, FIG. 15D is a side view of the second component, and FIG. 15E is a sectional view of the second component taken along line A-A of FIG. 15A. Second disk part 732 includes recessed line 7324, recessed surface part 810, hole 820 and groove 830.

As illustrated in FIG. 15A, recessed line 7324 is disposed at the peripheral portion of second surface 7322 which is an opposite side of first surface 7321 in the Z direction, and, as illustrated in FIG. 15B and FIG. 15D, is depressed from second surface 7322. The depth of recessed line 7324 from second surface 7322 is, for example, 1 mm As illustrated in FIG. 12A, recessed surface part 810 is a recess formed at a position facing film 770 in second surface 7322. In plan view, recessed surface part 810 has a circular shape as illustrated in FIG. 15A. Recessed surface part 810 has a diameter of, for example, 1.8 mm Recessed surface part 810 is formed with a curved surface slightly depressed from second surface 7322, and is formed such that film 770 makes close contact with at least a part surrounding hole 820 of recessed surface part 810 when film 770 is deflected under a pressure of the irrigation liquid having a value equal to or higher than a predetermined value in pressure transfer pipe 725 in pressure transfer pipe 725.

As illustrated in FIG. 15A, hole 820 opens at a center portion of recessed surface part 810. The opening of hole 820 on recessed surface part 810 side has a circular shape. As illustrated in FIG. 15E, hole 820 penetrates second disk part 732 along the Z direction, and is in communication with the inside of discharge part 740. The opening of hole 820 on recessed surface part 810 side has a diameter of, for example, 1 mm, and is smaller than the opening on discharge part 740 side. That is, hole 820 is a tapered hole whose diameter gradually increases from recessed surface part 810 side toward discharge part 740 side along the Z direction.

As illustrated in FIG. 15E, groove 830 is formed on second surface 7322 including recessed surface part 810 so as to cross recessed surface part 810 along the radial direction thereof. In emitter 620, groove 830 communicates between channel 760 and hole 820 as illustrated in FIG. 12A. Groove 830 has a width of, for example, 0.2 mm, and has a depth from second surface 7322 of, for example, 0.05 mm As with emitter main body 200 of Embodiment 1, each of the first component and second component is integrally molded by injection molding using one resin material having flexibility (for example, polypropylene). It is to be noted that examples of the material of the first component and second component include resin and rubber, and examples of the resin include polyethylene and silicone. The flexibility of the material is properly adjusted by the type of the resin material, mixture of two or more resin materials or the like in accordance with the flexibility required for film 770.

(Operation)

Protrusion line 7314 of first disk part 731 is fitted with recessed line 7324 of second disk part 732, whereby second surface 7312 of first disk part 731 and second surface 7322 of second disk part 732 make close contact with each other and thus emitter 620 is formed as illustrated in FIG. 12B. Further, second surfaces 7312 and 7322 may be joined by welding of a resin material, by bonding using an adhesive agent, by pressure bonding of one of them to the other or the like.

As illustrated in FIG. 10, emitter 620 is attached to tube 110 by inserting water collecting part 720 and pressure transfer pipe 725 to the tube wall of tube 110. Emitter 620 may be attached to tube 110 by penetrating the tube wall of tube 110 with water collecting part 720 and pressure transfer pipe 725, or by inserting water collecting part 720 and pressure transfer pipe 725 to an opening part for insertion which is preliminarily formed on the tube wall of tube 110. The former configuration is favorable for freely attaching emitter 620 to tube 110, and the latter configuration is favorable for preventing leakage of irrigation liquid from tube 110. Since water collecting part 720 and pressure transfer pipe 725 each has a barb at an end portion thereof, dropping of emitter 620 from tube 110 is prevented.

Figure 16A:
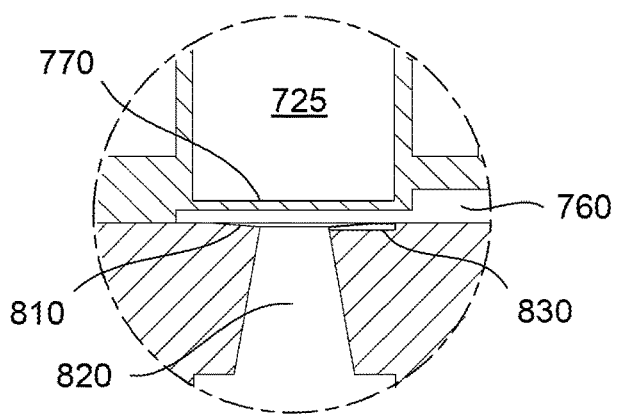
FIG. 16A schematically illustrates a state of part A of FIG. 12A in the case where the pressure of the irrigation liquid in the tube is equal to or higher than the first pressure value and is lower than the second pressure value, FIG. 16B schematically illustrates a state of part A of FIG. 12A in the case where the pressure of the irrigation liquid in the tube is equal to or higher than the second pressure value and is lower than the third pressure value, and FIG. 16C schematically illustrates a state of part A of FIG. 12A in the case where the pressure of the irrigation liquid in the tube is equal to or higher than the third pressure value.
Figure 16B:
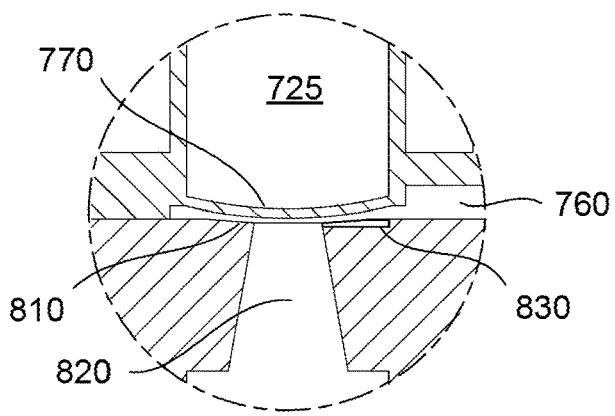
Figure 16C:
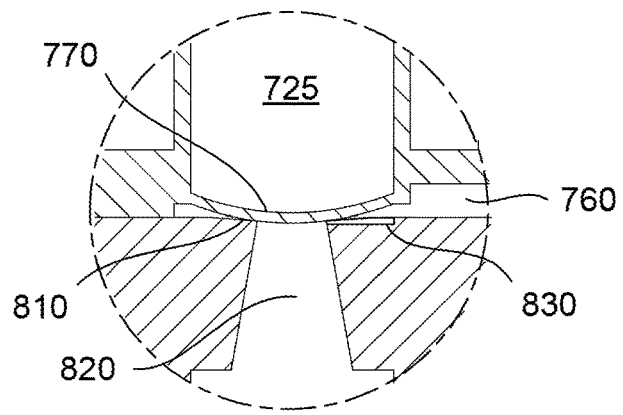

Next, discharge of irrigation liquid by emitter 620 is described. FIG. 16A schematically illustrates a state of part A of FIG. 12A in the case where the pressure of the irrigation liquid in tube 110 is equal to or higher than the first pressure value and is lower than the second pressure value, FIG. 16B schematically illustrates a state of part A of FIG. 12A in the case where the pressure of the irrigation liquid in tube 110 is equal to or higher than the second pressure value and is lower than the third pressure value, and FIG. 16C schematically illustrates a state of part A of FIG. 12A in the case where the pressure of the irrigation liquid in tube 110 is equal to or higher than the third pressure value.

Supply of irrigation liquid to trickle irrigation tube 500 is performed in a range where the pressure of the irrigation liquid does not exceed 0.1 MPa for the purpose of preventing damaging of tube 110 and emitter 620. When the irrigation liquid is supplied into tube 110, the irrigation liquid reaches flow rate adjustment valve 780 through water collecting part 720, and pressure transfer pipe 725 is filled with the irrigation liquid (FIG. 12B).

When the pressure of the irrigation liquid in tube 110 is equal to or higher than the first pressure value (for example, 0.005 MPa), flow rate adjustment valve 780 is pushed to first recess 7315 side, and the slit of flow rate adjustment valve 780 is expanded. In this manner, the irrigation liquid reaching flow rate adjustment valve 780 is supplied to pressure reduction channel 750 via adjustment valve 780 and through first recess 7315 (FIG. 12B). Thus, flow rate adjustment valve 780 suppresses distribution of the irrigation liquid in emitter 620 when the pressure of the irrigation liquid is lower than the first pressure. Consequently, the irrigation liquid can be supplied to tube 110 with a high pressure, and therefore the configuration in which emitter 620 has flow rate adjustment valve 780 is favorable for forming trickle irrigation tube 500 having a greater length, for example.

The pressure of the irrigation liquid flowing through pressure reduction channel 750 is reduced as a result of pressure reduction caused by the shape of reduction channel 750 in plan view (zigzag shape). In addition, floats in the irrigation liquid are entangled in the turbulent flow generated between the above-mentioned protrusions of pressure reduction channel 750, and retained in pressure reduction channel 750. In this manner, floats are further removed from irrigation liquid by pressure reduction channel 750.

The irrigation liquid having passed through pressure reduction channel 750 in which the pressure is reduced and the floats are removed is supplied to second recess 7316 (the space sandwiched by film 770 and recessed surface part 810) through channel 760 and passes through hole 820 as illustrated in FIG. 16A. Then, the irrigation liquid is discharged out of tube 110 through part 740 (FIG. 12A).

As the pressure of the irrigation liquid in tube 110 increases, the flow rate of the irrigation liquid flowing into emitter 620 from water collecting part 720 increases, and consequently the discharge rate of the irrigation liquid from discharge port 740 increases.

When the pressure of the irrigation liquid in tube 110 is equal to or higher than the second pressure value (for example, 0.02 MPa), film 770 is pushed by the irrigation liquid in pressure transfer pipe 725 and is deflected as illustrated in FIG. 16B. Since no structure which causes pressure reduction is provided inside pressure transfer pipe 725, the pressure of the irrigation liquid in pressure transfer pipe 725 is substantially the same as that of the irrigation liquid in tube 110. In this manner, pressure transfer pipe 725 transmits the pressure of the irrigation liquid in tube 110 to the rear surface of film 770. Thus, film 770 is pushed from pressure transfer pipe 725 side by the pressure of the irrigation liquid in the tube, and the distance between film 770 and recessed surface part 810 is reduced. For example, the distance is changed to 0.25 mm to 0.15 mm Consequently, the amount of the irrigation liquid which passes between film 770 and recessed surface part 810 is reduced, and the increase of the discharge rate of the irrigation liquid from discharge port 740 is suppressed.

When the pressure of the irrigation liquid in tube 110 is equal to or higher than the third pressure value (for example, 0.05 MPa), film 770 is pushed and further deflected by the irrigation liquid in tube 110 and brought into close contact with recessed surface part 810 as illustrated in FIG. 16C. In this manner, film 770 functions as a valve element for restricting the distribution of irrigation liquid, and recessed surface part 810 functions as a valve seat. Meanwhile, since groove 830 is not sealed even when film 770 makes close contact with recessed surface part 810, the irrigation liquid having passed through channel 760 is supplied to hole 820 through groove 830. Consequently, the amount of the irrigation liquid which passes through hole 820 is restricted to a flow rate which can pass through groove 830, and the discharge rate of the irrigation liquid from discharge port 740 becomes substantially constant. In this manner, emitter 620 quantitatively discharges the irrigation liquid from tube 110 supplied with the irrigation liquid.

(Effect)

As described, emitter 620 includes: water collecting part 720 for receiving irrigation liquid in tube 110, water collecting part 720 having a cylindrical shape to be inserted to tube 110 from outside of tube 110, tube 110 being configured to distribute irrigation liquid; pressure reduction channel 750 for allowing the irrigation liquid received from water collecting part 720 to flow therethrough while reducing a pressure of the irrigation liquid; a flow rate control part for controlling a flow rate of the irrigation liquid supplied from pressure reduction channel 750 in accordance with the pressure of irrigation liquid in tube 110; and discharge part 740 for discharging from tube 110 the irrigation liquid having a flow rate controlled by the flow rate control part to outside of tube 110. When one end of water collecting part 720 from which water collecting part 720 is inserted to tube 110 is defined as a tip end and the other end of water collecting part 720 is a base end, a flange part is disposed at the base end of water collecting part 720. Flange part 730 is composed of a combination of first disk part 731 disposed at the base end of water collecting part 720 and second disk part 732 on which discharge part 740 is disposed, flange part 730 including pressure reduction channel 750 and the flow rate control part. The flow rate control part includes: film 770 having flexibility disposed to face a channel on a downstream side relative to pressure reduction channel 750; a pressure transmission part for transmitting the pressure of irrigation liquid in tube 110 to a rear surface of film 770; a recessed surface part 810 depressed with respect to film 770 and disposed at a channel on a downstream side relative to pressure reduction channel 750 such that recessed surface part 810 faces film 770 without making contact with film 770, recessed surface part 810 being capable of making close contact with film 770, and; a hole opening at recessed surface part 810 and communicated with discharge part 740; and groove 830 formed on recessed surface part 810 and configured to communicate between the hole and the channel on outside relative to recessed surface part 810. When water collecting part 720 is inserted to tube 110, emitter 620 is disposed to tube 110, and trickle irrigation tube 500 is formed. Film 700 starts to deflect when the pressure of the irrigation liquid in tube 110 is equal to or higher than the above-mentioned second pressure value, and film 700 makes close contact with the recessed surface part when the pressure is equal to or higher than the third pressure value. Therefore, emitter 620 discharges the irrigation liquid such that the amount of the liquid is limited to the amount which passes through groove 830 even when the pressure of the irrigation liquid in tube 110 increases. In this manner, emitter 620 quantitatively discharges the irrigation liquid in tube 110 from discharge port 740 in accordance with the pressure of the irrigation liquid in tube 110, and thus can stabilize the discharge rate of the irrigation liquid.

Further, since the above-described components of emitter 620 are composed of a recess or a through hole formed on the first surface or the second surface of the first component and the second component, each of the first component and the second component can be integrally produced by injection molding. Therefore, emitter 620 can further reduce manufacturing cost in comparison with conventional emitters composed of three parts.

In addition, with the configuration in which first disk part 731 includes pressure reduction channel 750, pressure transfer pipe 725 and film 770 and second disk part 732 includes recessed surface part 810, hole 820 and groove 830, each of the first component and the second component can be fabricated with a further simplified structure, which is further favorable from the standpoint of further reducing manufacturing cost.

Further, as described later in the modification, with the configuration in which first disk part 731 and second disk part 732 are integrally formed with the same material, emitter 620 can be produced with one component, which is favorable from the standpoint of further reducing manufacturing cost.

In addition, with the configuration in which water collecting part 720 further includes flow rate adjustment valve 780 for expanding the channel for the irrigation liquid when the pressure of the irrigation liquid in tube 110 is equal to or higher than a predetermined value, the irrigation liquid can be supplied to tube 110 with a higher pressure, which is favorable from the standpoint of forming trickle irrigation tube 500 having a greater length.

(Modification)

In trickle irrigation tube 500, the above-described configurations may be partially changed, or other configurations may be additionally provided as long as the above-described effect is achieved.

Figure 17A:
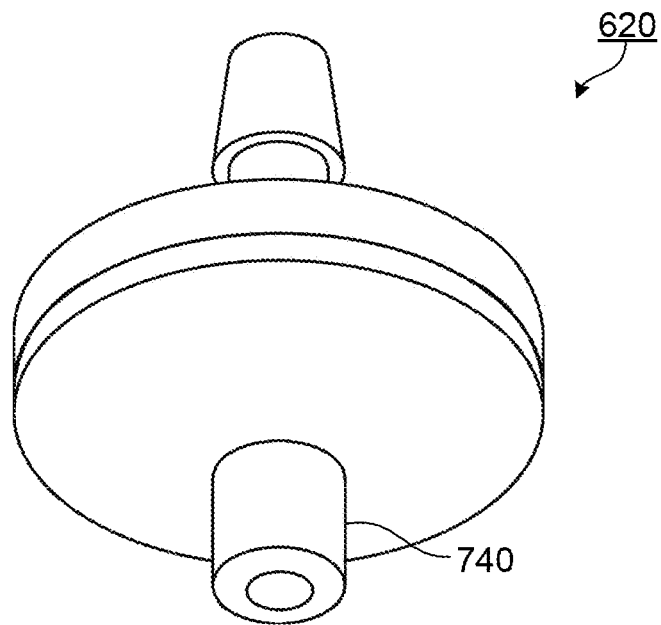
FIG. 17A schematically illustrates a first modification of a discharge part of the emitter according to Embodiment 2, and FIG. 17B schematically illustrates a second modification of the discharge part.
Figure 17B:
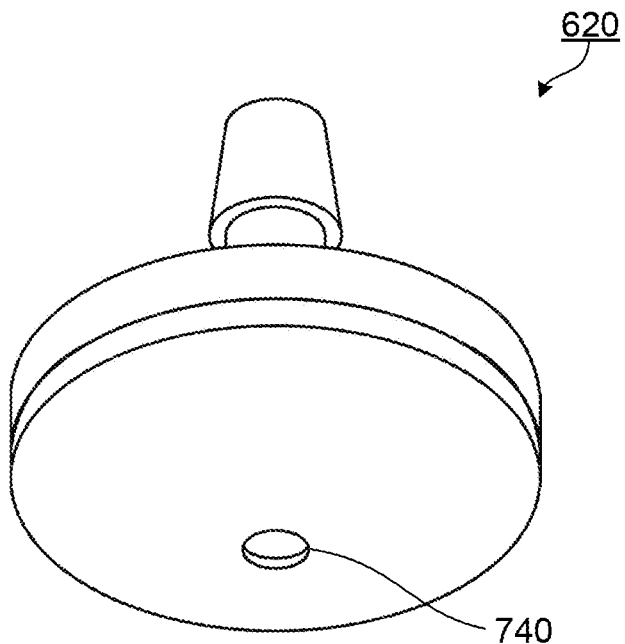

For example, discharge part 740 may not have barb 741 as illustrated in FIG. 17A, and may be an opening part which opens at first surface 7321 of second disk part 732 as illustrated in FIG. 17B.

In addition, tube 110 may be a seamless tube, a tube composed of slender sheet(s) joined together along the longitudinal direction, or a tube having a gap formed at the above-mentioned joining part of the sheets so as to communicate between the inside and the outside of tube 110, or a pipe sandwiched by the sheets at the joining part.

In addition, the first component and the second component may be integrally formed so as to be turnable about a hinge part integrally formed with the first component and the second component. In this case, the number of components of emitter 620 can be further reduced, that is emitter 620 can be produced with one component.

In addition, emitter 620 may include, in place of pressure transfer pipe 725, a part for transmitting to film 770 deflection of film 770 in accordance with the pressure of the irrigation liquid in tube 110, or, a part capable of directly or indirectly transmitting to the rear surface of film 770 the pressure of the irrigation liquid in the tube.

While recessed surface part 810 is a curved surface slightly depressed from second surface 7322 in the present embodiment, other suitable configurations may also be adopted as long as close contact with film 770 around hole 820 is achieved. For example, recessed surface part 810 may be a planer part located at a position nearer to first surface 7321 side than second surface 7322.

This application is entitled to and claims the benefit of Japanese Patent Application No. 2013-245228 filed on Nov. 27, 2013, the disclosure each of which including the specification, drawings and abstract is incorporated herein by reference in its entirety.

INDUSTRIAL APPLICABILITY

According to the present invention, an emitter which can discharge liquid with an appropriate speed by the pressure of the liquid to be discharged can be easily provided. Accordingly, popularization of the above-mentioned emitter in technical fields such as trickle irrigations and endurance tests where long-term discharging is required, and further development of the technical fields can be expected.

REFERENCE SIGNS LIST 100, 500 Trickle irrigation tube
110 Tube
120, 620 Emitter
130 Discharge port
200 Emitter main body
201, 7311, 7321 First surface
202, 7312, 7322 Second surface
210 Filter part
211, 7315 First recess
212, 7316 Second recess
213 First protrusion line
214 Second protrusion line
220, 720 Water collecting part
221, 780 Flow rate adjustment valve
230, 750 Pressure reduction channel
231, 232, 245, 830 Groove
233 Through hole
240 Flow rate control part
241, 246, 7313 Recess
242 Protrusion
243 End surface
244, 820 Hole
250, 740 Discharge part
251, 7314 Protrusion line
300, 770 Film
301 Hinge part
302 Opening part
721, 726, 741 Barb
725 Pressure transfer pipe
730 Flange part
731 First disk part
732 Second disk part
760 Channel
810 Recessed surface part
2431 Outer ring part
2432 Tilted surface
7211, 7411, 7261 Large diameter part
7212, 7412, 7262 Tapered surface
7324 Recessed line

The invention claimed is:

1. An emitter for quantitatively discharging irrigation liquid in a tube from a discharge port communicating between an inside and an outside of the tube, the emitter being configured to be joined to an inner wall surface of the tube configured to distribute the irrigation liquid at a position corresponding to the discharge port, the emitter comprising:

a water collecting part for receiving the irrigation liquid in the tube;

a pressure reduction channel for allowing the irrigation liquid received from the water collecting part to flow therethrough while reducing a pressure of the irrigation liquid;

a flow rate control part for controlling a flow rate of the irrigation liquid supplied from the pressure reduction channel in accordance with the pressure of the irrigation liquid in the tube; and a discharge part to which the irrigation liquid, having a flow rate controlled by the flow rate control part, is supplied, the discharge part being configured to face the discharge port, wherein:

the water collecting part opens at a first surface which is not joined to the tube in the emitter, the flow rate control part includes:

an opening part which opens at the first surface, a film having flexibility and sealing the opening part to block a communication of a channel on a downstream side relative to the pressure reduction channel and the inside of the tube, the film being disposed such that the film forms an exterior surface of the emitter, the exterior surface facing the inside of the tube, a recessed surface part depressed with respect to the film, capable of making contact with the film, and disposed at a position where the recessed surface part faces the film in the channel on a downstream side relative to the pressure reduction channel without making contact with the film, a hole opening at the recessed surface part and communicated with the discharge part, and a groove formed on the recessed surface part and configured to communicate between the hole and the channel on an outside relative to the recessed surface part, the film makes contact with the recessed surface part when the pressure of the irrigation liquid in the tube is equal to or higher than a predetermined value, and the groove communicates between the hole and the channel on the outside relative to the recessed surface part when the film makes contact with the recessed surface part.

2. The emitter according to claim 1, wherein:
an entirety of the emitter is integrally molded with one material having the flexibility.

3. The emitter according to claim 2, wherein the water collecting part includes a flow rate adjustment valve configured to expand a channel of the irrigation liquid when the pressure of the irrigation liquid in the tube is equal to or higher than a predetermined value.

4. The emitter according to claim 1, wherein the water collecting part includes a flow rate adjustment valve configured to expand a channel of the irrigation liquid when the pressure of the irrigation liquid in the tube is equal to or higher than a predetermined value.

5. A trickle irrigation tube comprising:
a tube configured to distribute irrigation liquid, the tube including a discharge port communicating between an inside and an outside of the tube; and
an emitter for quantitatively discharging irrigation liquid in the tube from the discharge port, the emitter being configured to be joined to an inner wall surface of the tube at a position corresponding to the discharge port, wherein:
the emitter comprises:
a water collecting part for receiving the irrigation liquid in the tube, a pressure reduction channel for allowing the irrigation liquid received from the water collecting part to flow therethrough while reducing a pressure of the irrigation liquid, a flow rate control part for controlling a flow rate of the irrigation liquid supplied from the pressure reduction channel in accordance with the pressure of the irrigation liquid in the tube, and a discharge part to which the irrigation liquid, having a flow rate controlled by the flow rate control part, is supplied, the discharge part being configured to face the discharge port, the water collecting part opens at a first surface which is not joined to the tube in the emitter, the flow rate control part includes:

an opening part which opens at the first surface, a film having flexibility and sealing the opening part to block a communication of a channel on a downstream side relative to the pressure reduction channel and the inside of the tube, the film being disposed such that the film forms an exterior surface of the emitter, the exterior surface facing the inside of the tube, a recessed surface part depressed with respect to the film, capable of making contact with the film, and disposed at a position where the recessed surface part faces the film in the channel on a downstream side relative to the pressure reduction channel without making contact with the film, a hole opening at the recessed surface part and communicated with the discharge part, and a groove formed on the recessed surface part and configured to communicate between the hole and the channel on an outside relative to the recessed surface part, the film makes contact with the recessed surface part when the pressure of the irrigation liquid in the tube is equal to or higher than a predetermined value, and the groove communicates between the hole and the channel on the outside relative to the recessed surface part when the film makes contact with the recessed surface part.

* * * * *